United States Patent
Smith

(10) Patent No.: US 8,915,409 B2
(45) Date of Patent: Dec. 23, 2014

(54) SYSTEM AND MECHANISMS PROVIDING AN ADJUSTABLE PERCH FOR A WEARER OF A HOLDER BASE WITH DEVICE

(76) Inventor: Mark Smith, Larkspur, CA (US)

(*) Notice: Subject to any disclaimer, the term of this patent is extended or adjusted under 35 U.S.C. 154(b) by 106 days.

(21) Appl. No.: 13/344,604

(22) Filed: Jan. 5, 2012

(65) Prior Publication Data

US 2012/0167349 A1    Jul. 5, 2012

Related U.S. Application Data

(60) Provisional application No. 61/430,130, filed on Jan. 5, 2011.

(51) Int. Cl.
| | |
|---|---|
| F16M 13/00 | (2006.01) |
| B65H 75/44 | (2006.01) |
| F16M 13/04 | (2006.01) |
| F16M 11/04 | (2006.01) |
| F16G 11/10 | (2006.01) |
| A45F 5/00 | (2006.01) |

(52) U.S. Cl.
CPC ........... *F16M 13/00* (2013.01); *B65H 75/4428* (2013.01); *F16M 13/04* (2013.01); *A45F 2200/0516* (2013.01); *F16M 11/041* (2013.01); *F16G 11/103* (2013.01); *A45F 5/004* (2013.01); *Y10S 224/93* (2013.01)
USPC ............................. 224/162; 224/258; 224/930

(58) Field of Classification Search
USPC ............. 224/162, 258, 269, 257, 265; 24/3.4, 24/129 R, 115 H, 136 K, 136 A, 115 M, 24/132 R; 242/378.2, 380, 396.2, 396.6, 242/396.9, 396.8, 396.1, 388.2, 377, 407, 242/382.1, 383.3, 385, 385.3, 385.4; 63/38
See application file for complete search history.

(56) References Cited

U.S. PATENT DOCUMENTS

| | | | | |
|---|---|---|---|---|
| 1,043,092 | A * | 11/1912 | Goodwin | 242/380 |
| 5,279,473 | A * | 1/1994 | Rozon | 242/377 |
| 6,715,214 | B1 * | 4/2004 | Lin | 33/755 |
| 6,942,532 | B2 * | 9/2005 | Snyder | 441/75 |
| 7,360,320 | B2 * | 4/2008 | Kelley | 33/761 |
| 7,530,519 | B2 * | 5/2009 | McDuff et al. | 242/385.4 |

FOREIGN PATENT DOCUMENTS

JP    2008194499 A * 8/2008

* cited by examiner

*Primary Examiner* — Justin Larson
*Assistant Examiner* — Phillip Schmidt
(74) *Attorney, Agent, or Firm* — Matthew J. Lattig; Charter IP, LLC

(57) ABSTRACT

A system is described that includes a base adapted to hold a device which is removable therefrom, the system including a retractor mechanism coupled to the base and having a retractable cord wound thereon with both ends extending therefrom through at least one opening as a line part of the retractable cord for access by a wearer of the base, and setting means providing adjustability of a perch position on the wearer for the base.

15 Claims, 23 Drawing Sheets

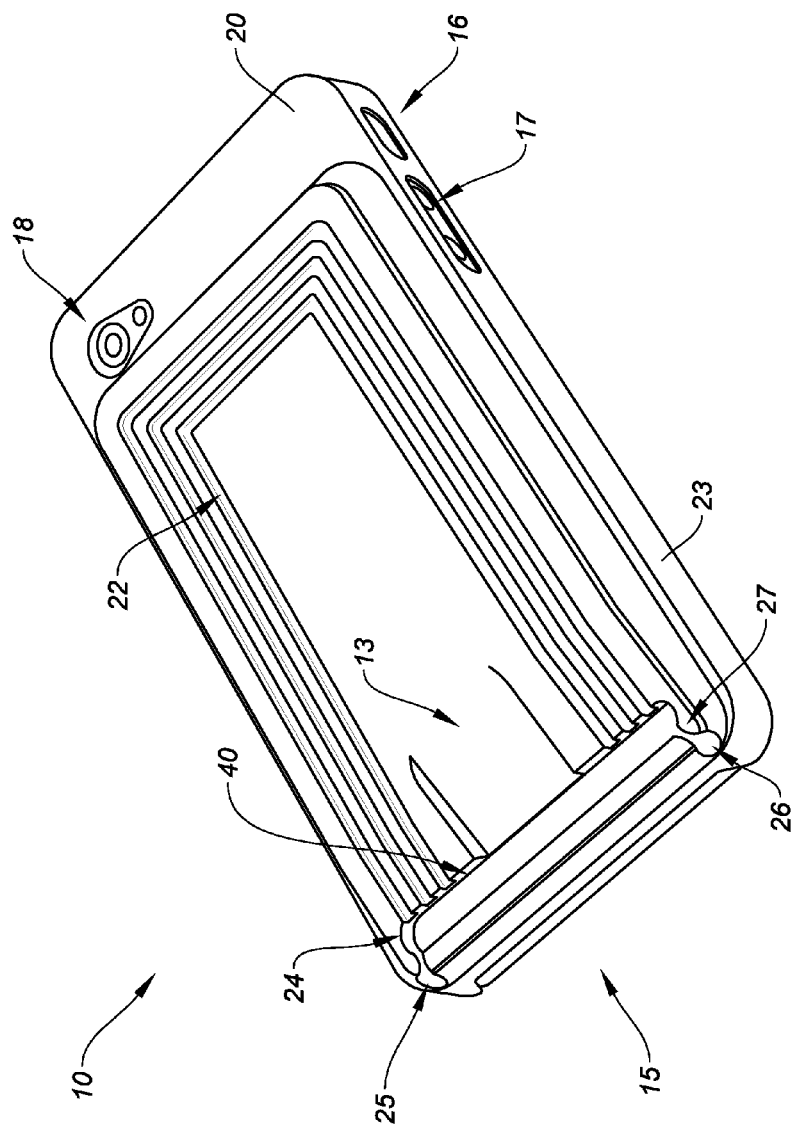

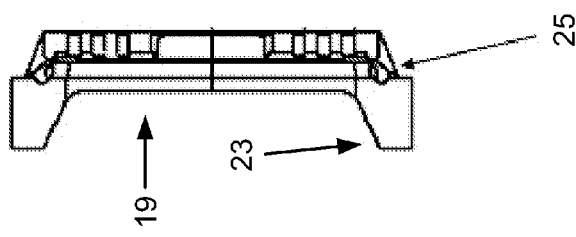
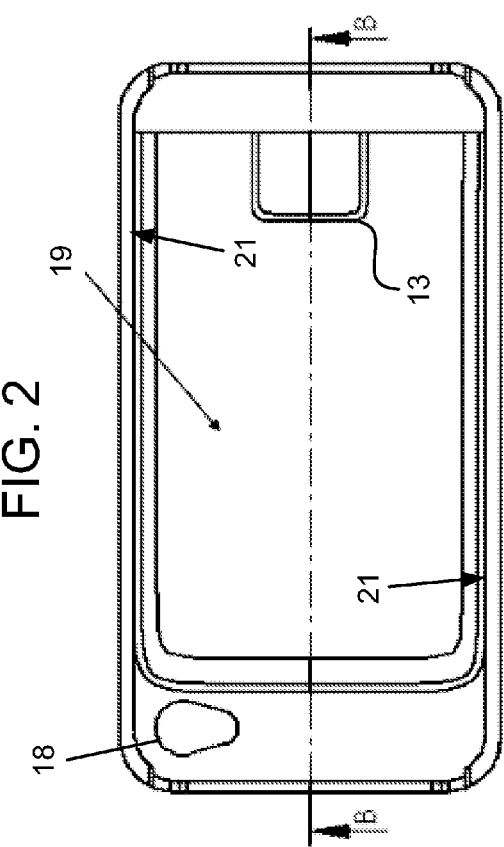
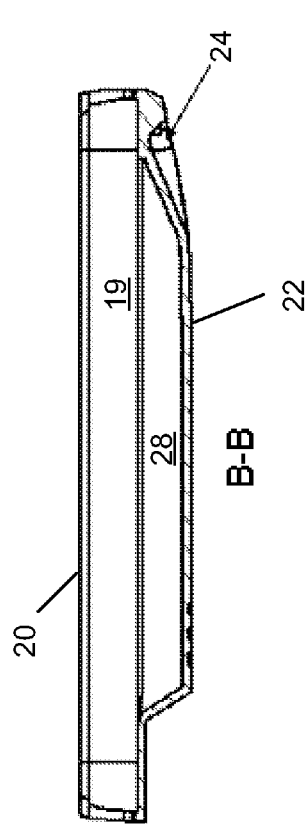
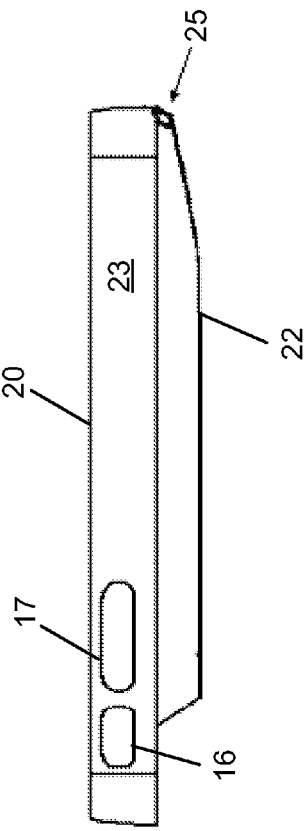

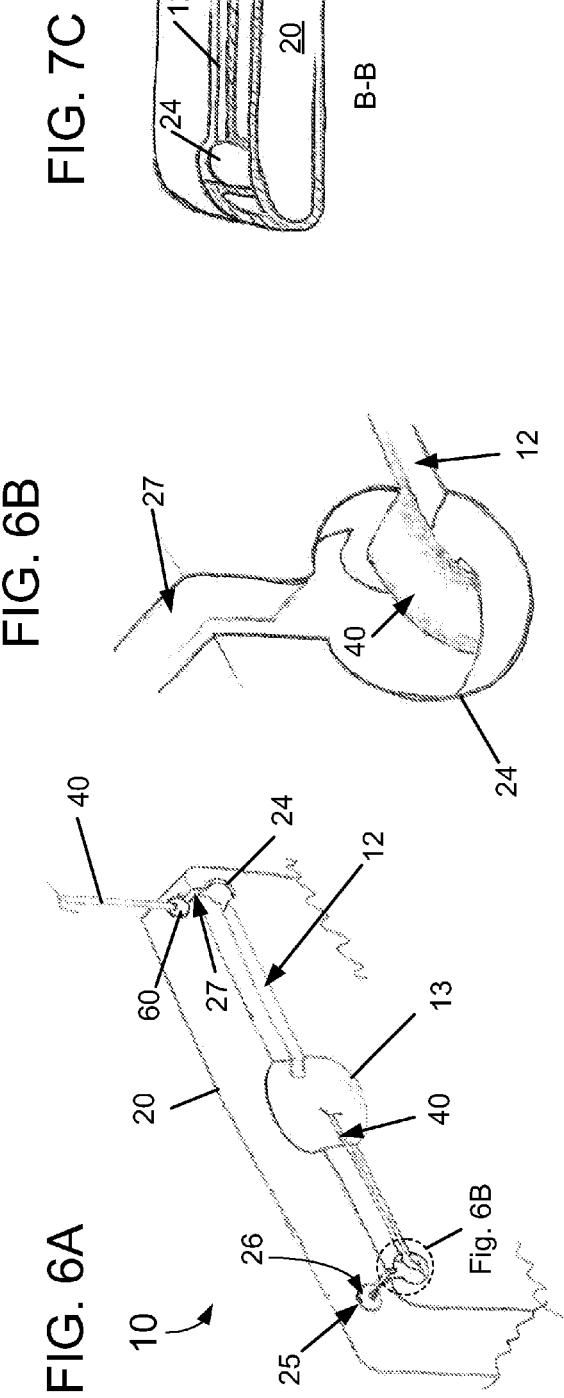

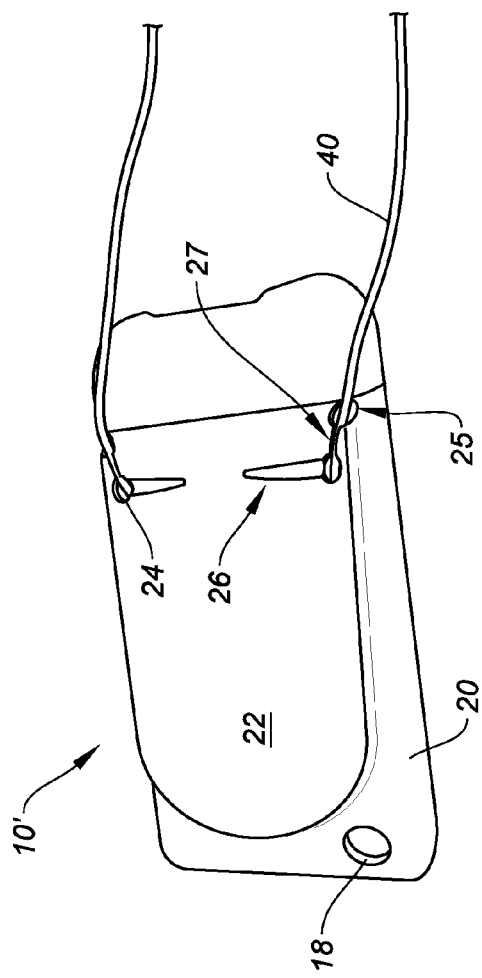
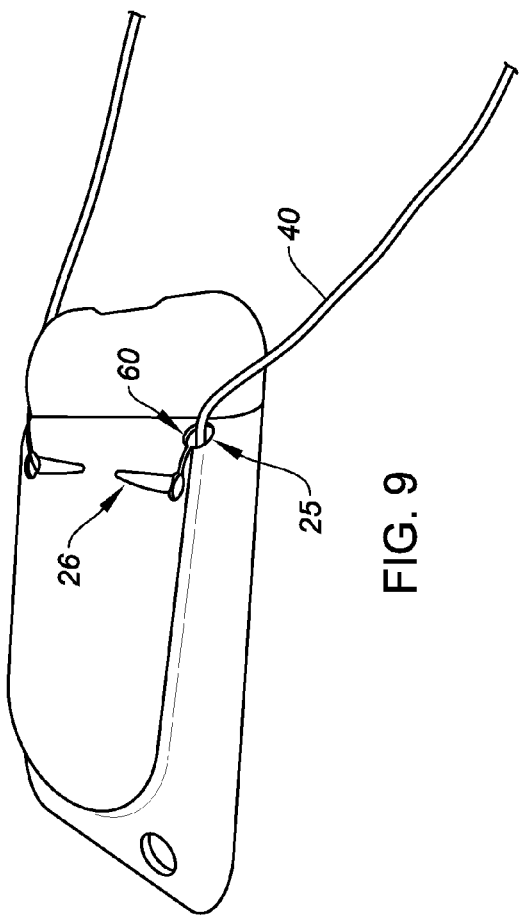

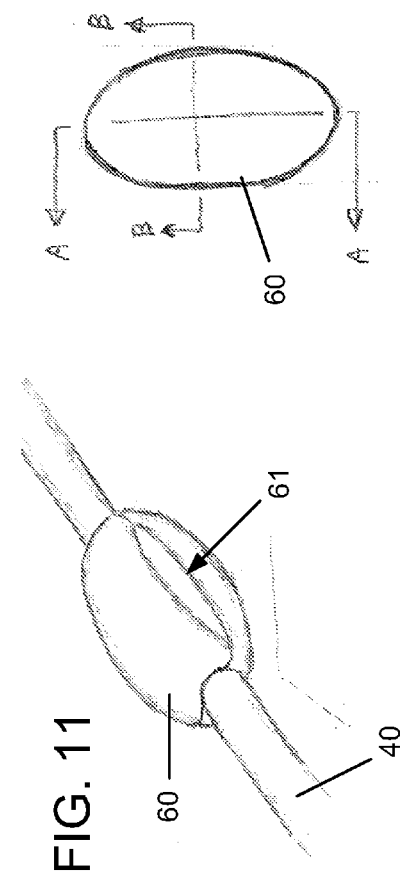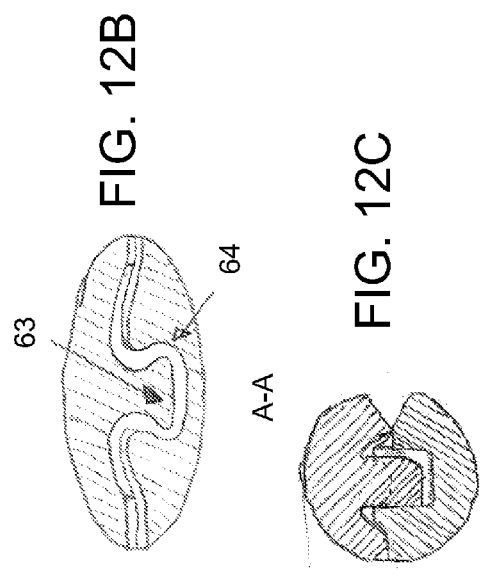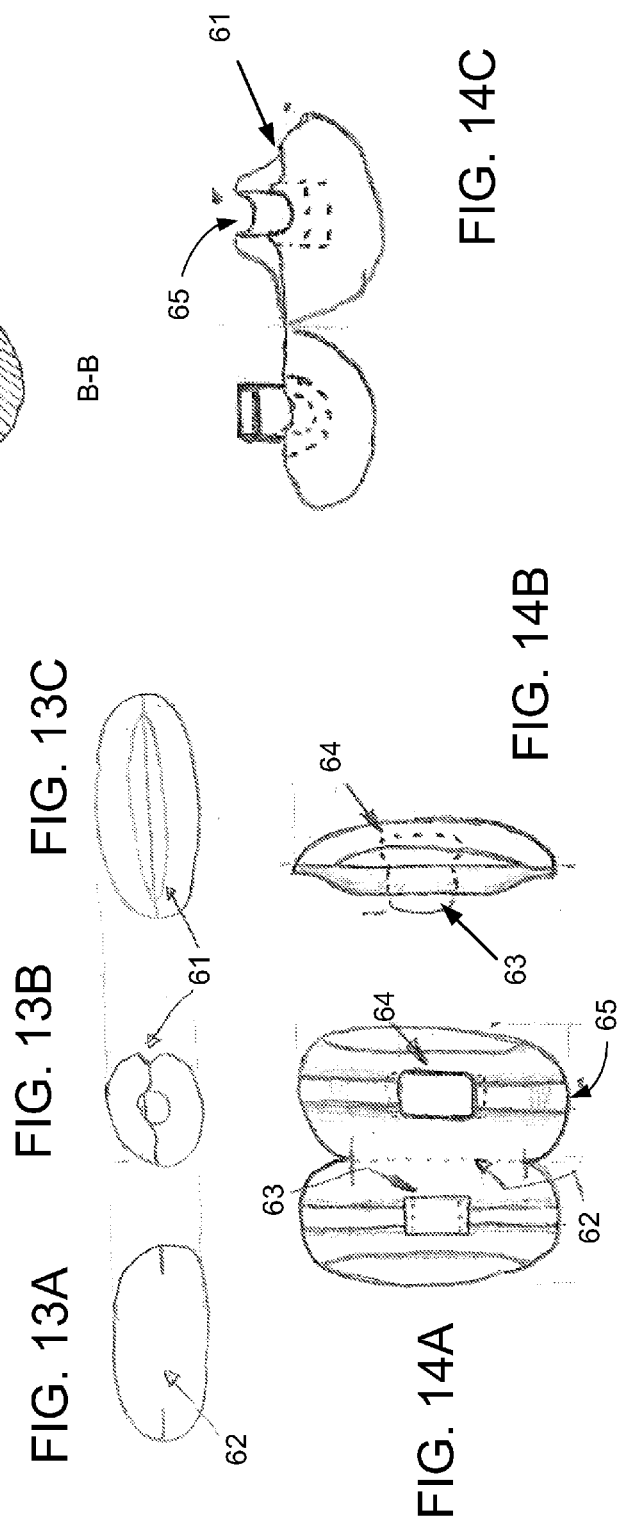

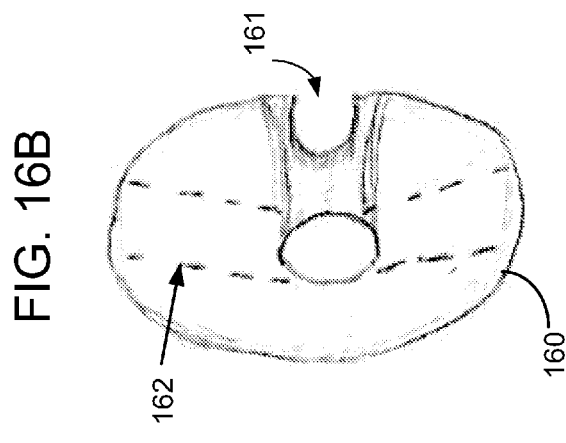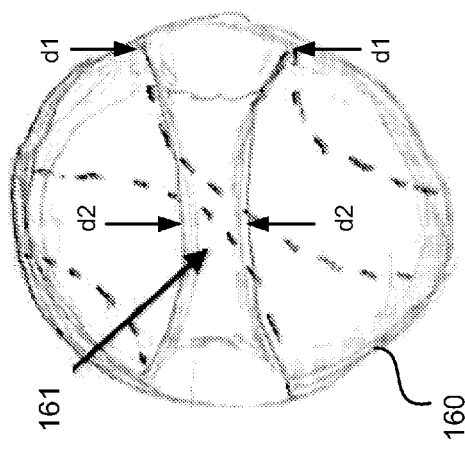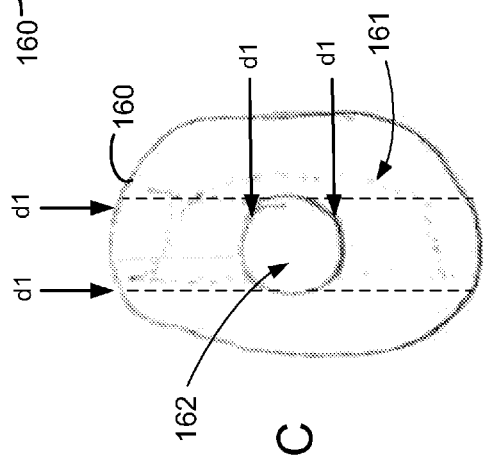

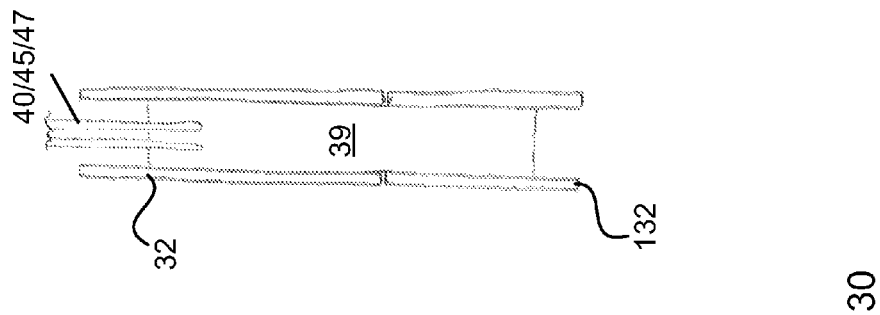
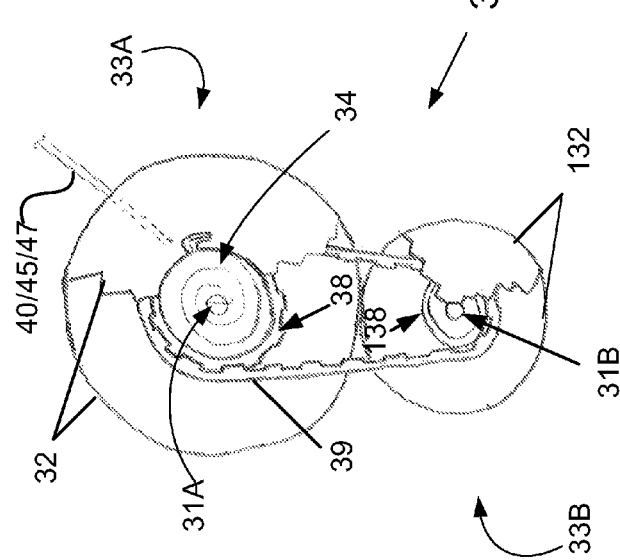
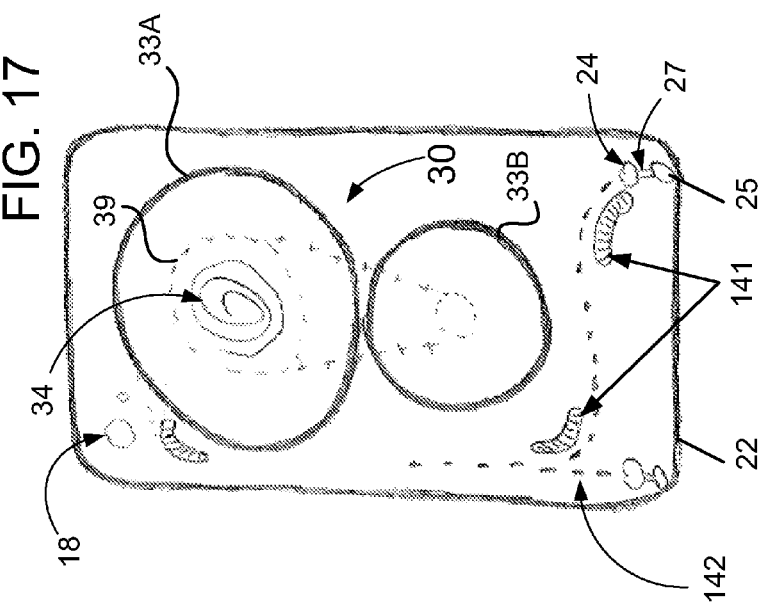

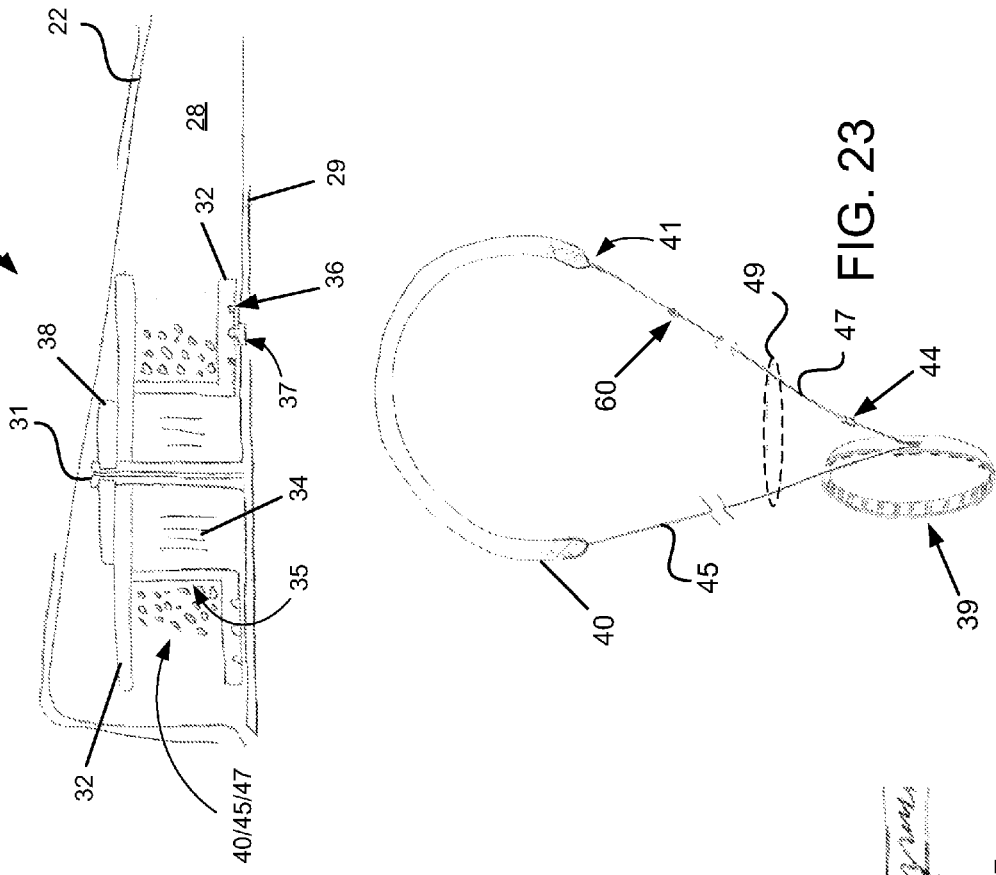
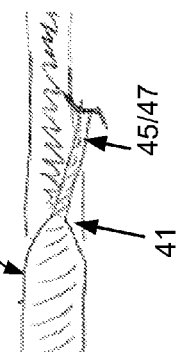
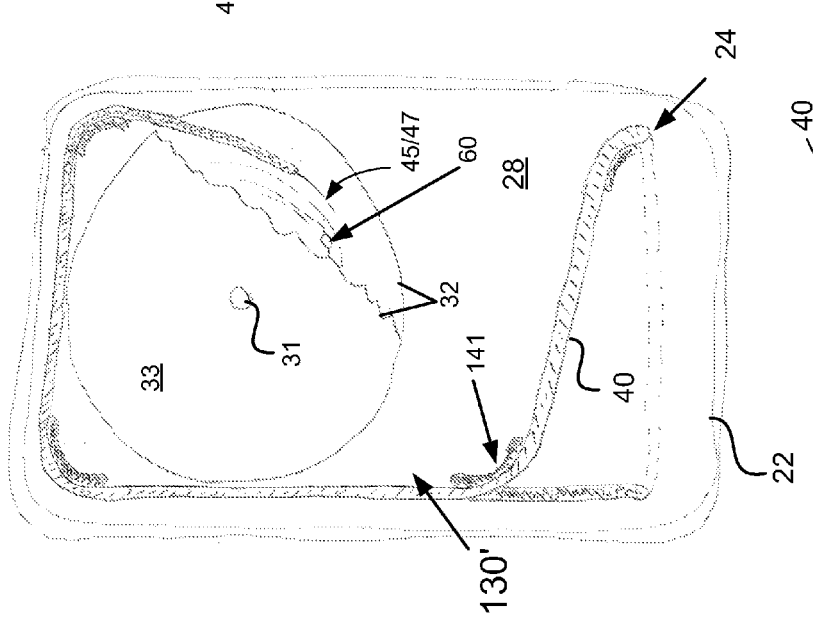

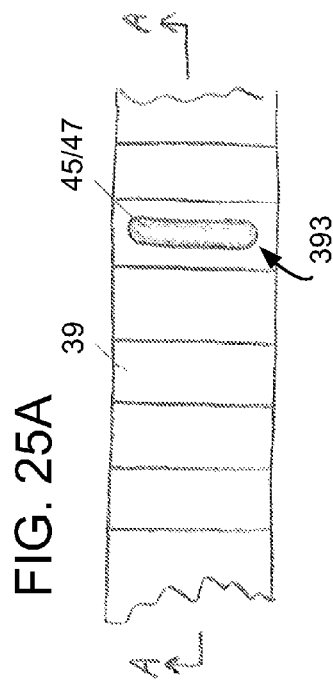
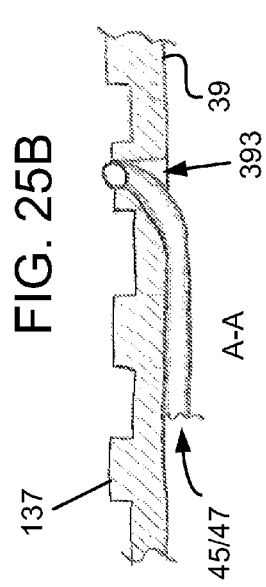
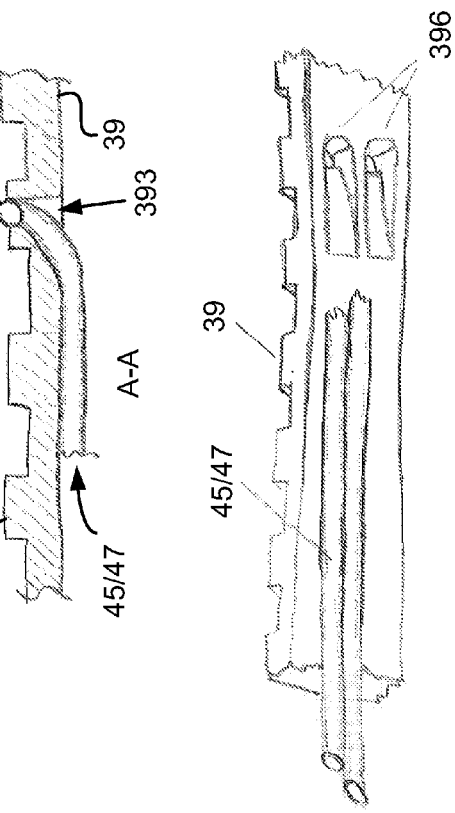
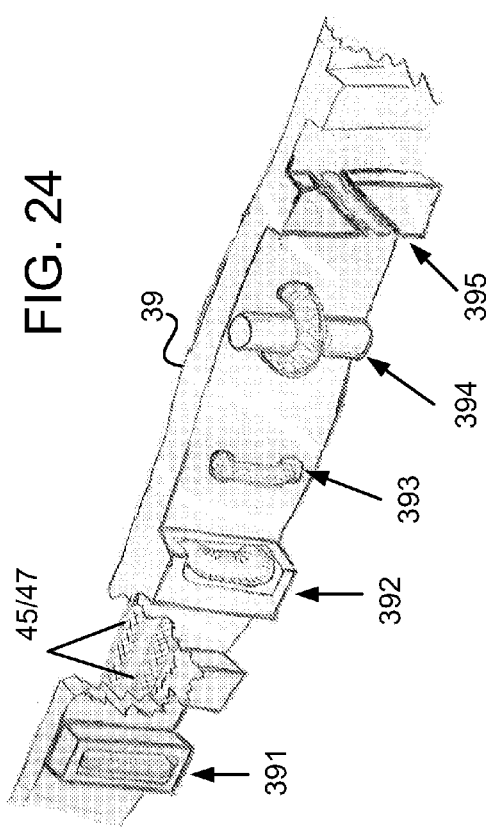
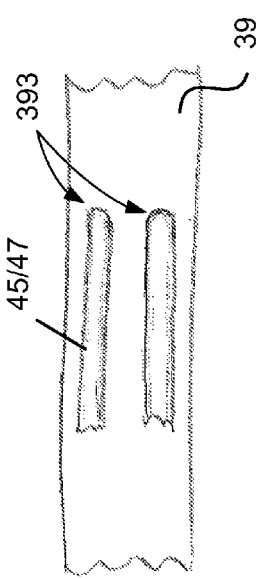

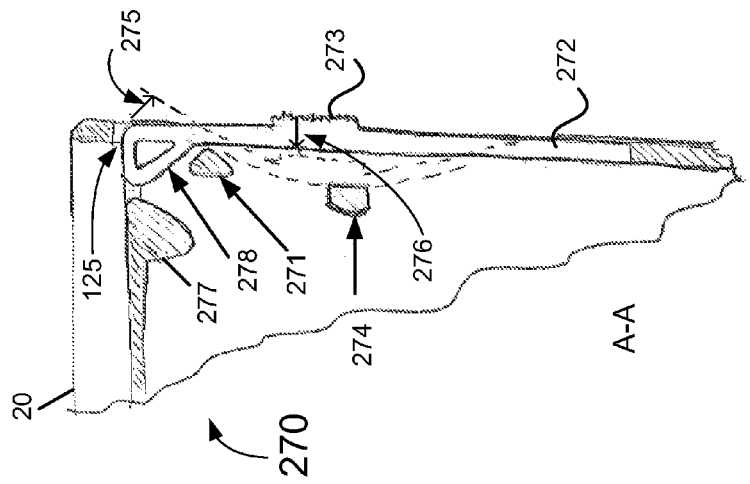
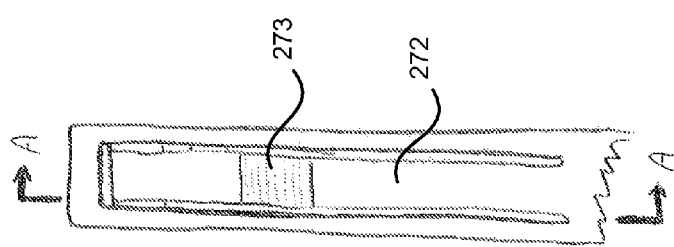
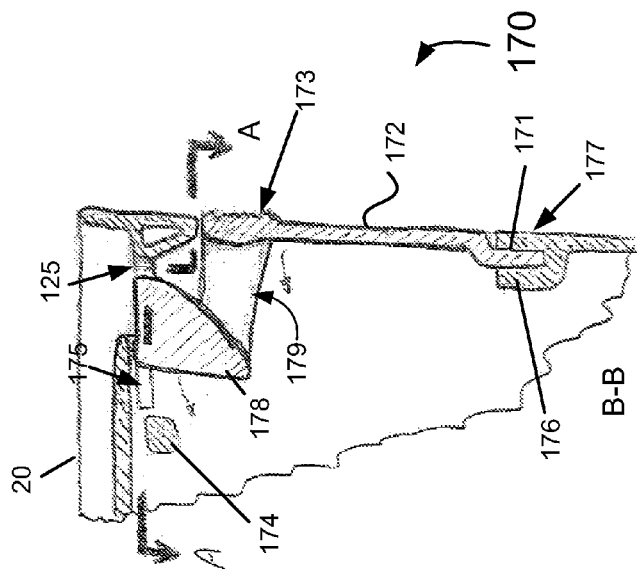
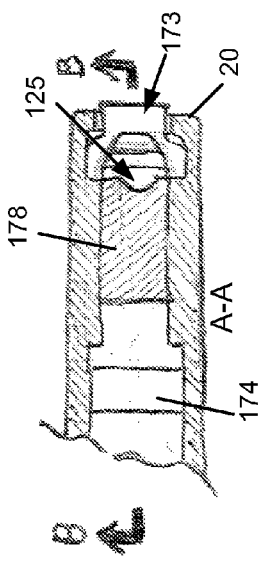

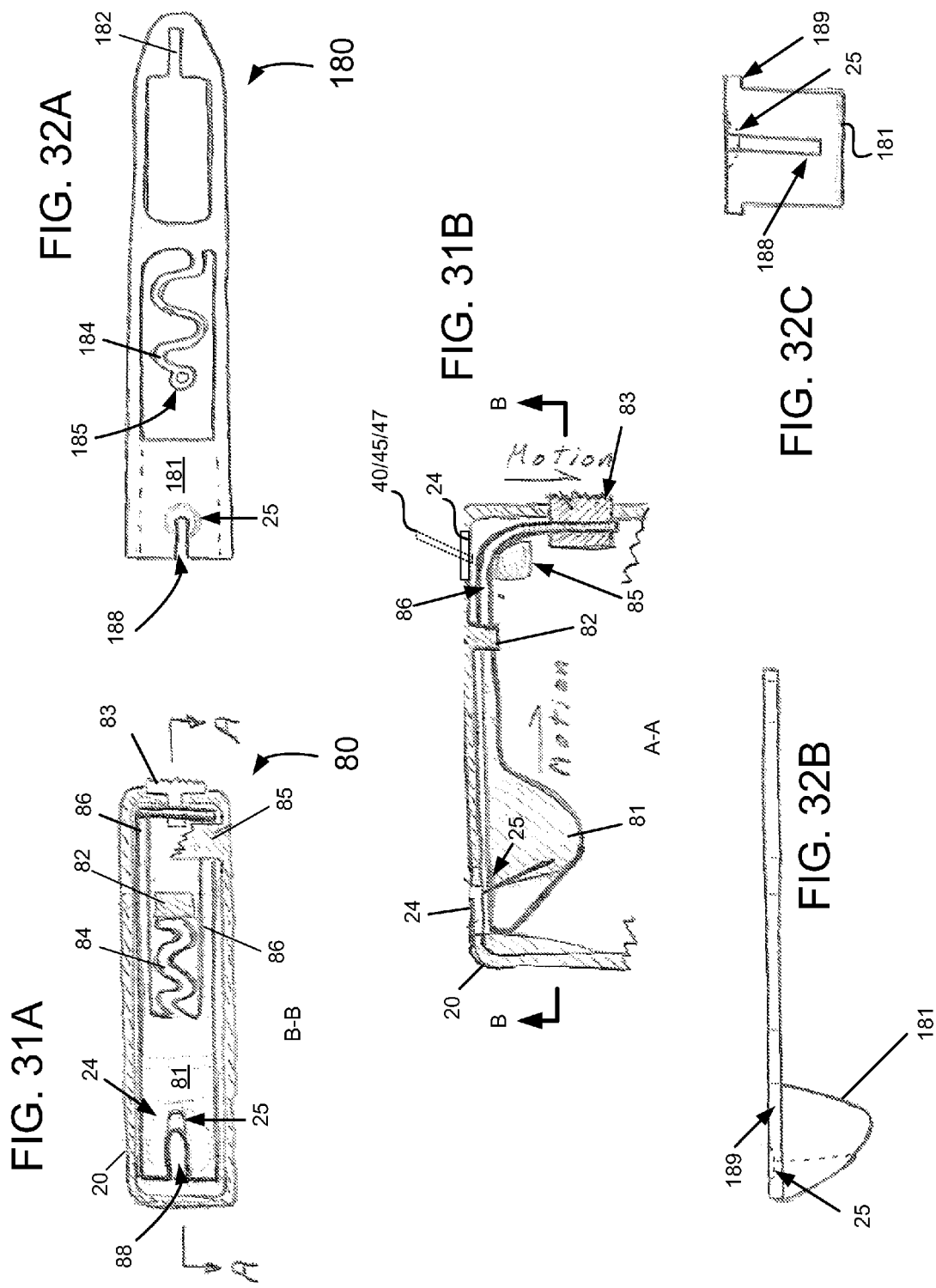

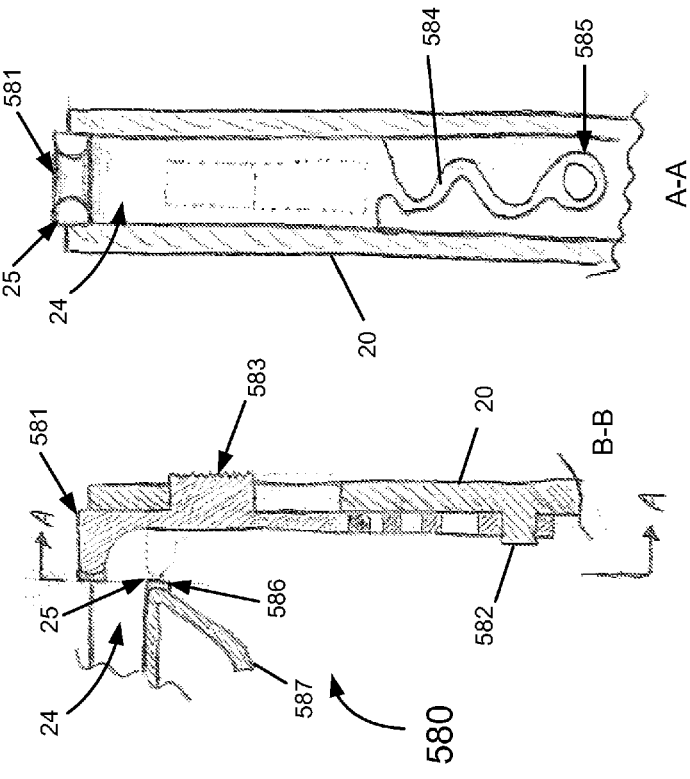
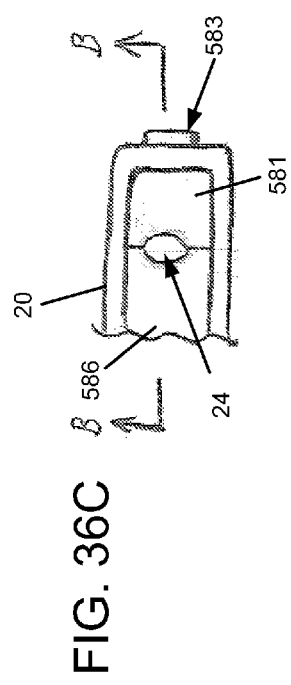
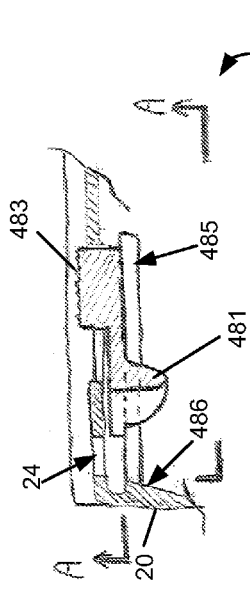
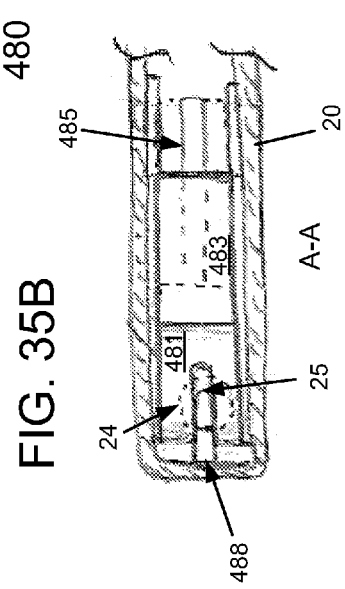
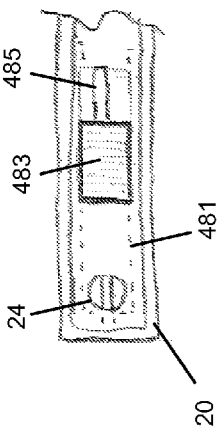

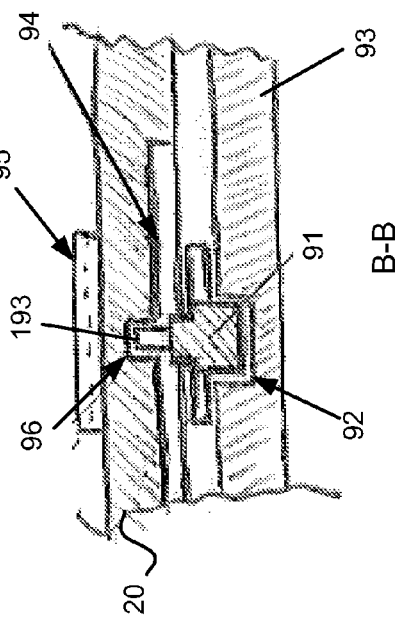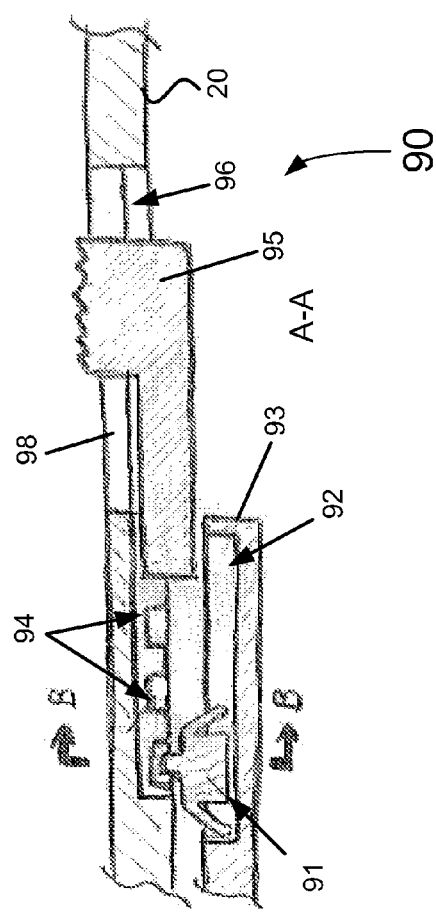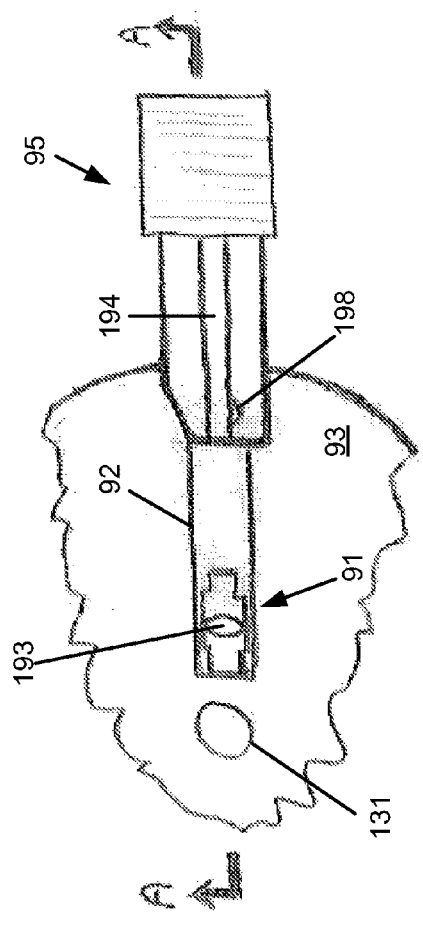

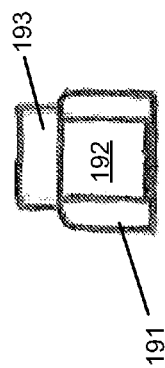
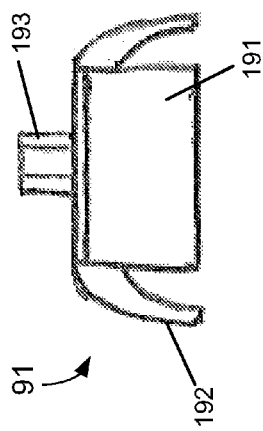
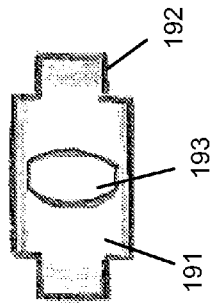
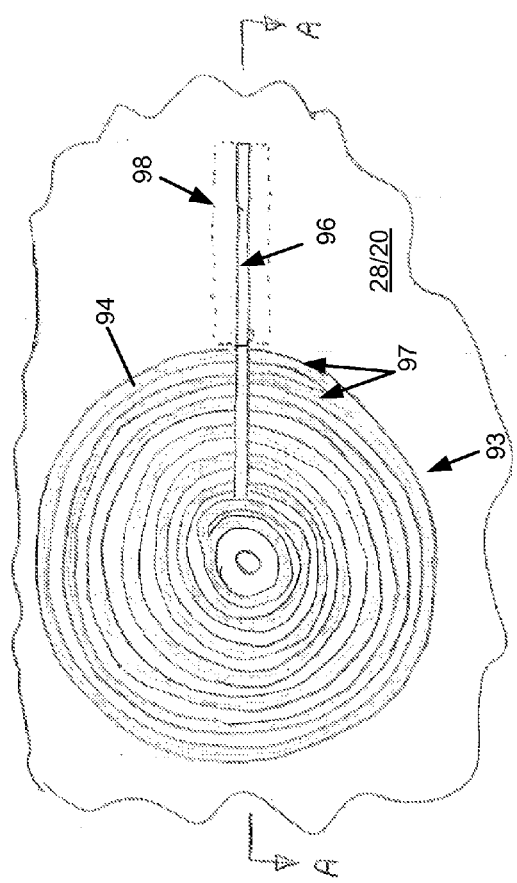
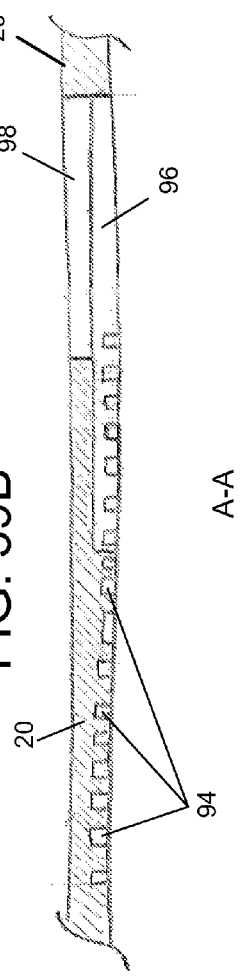

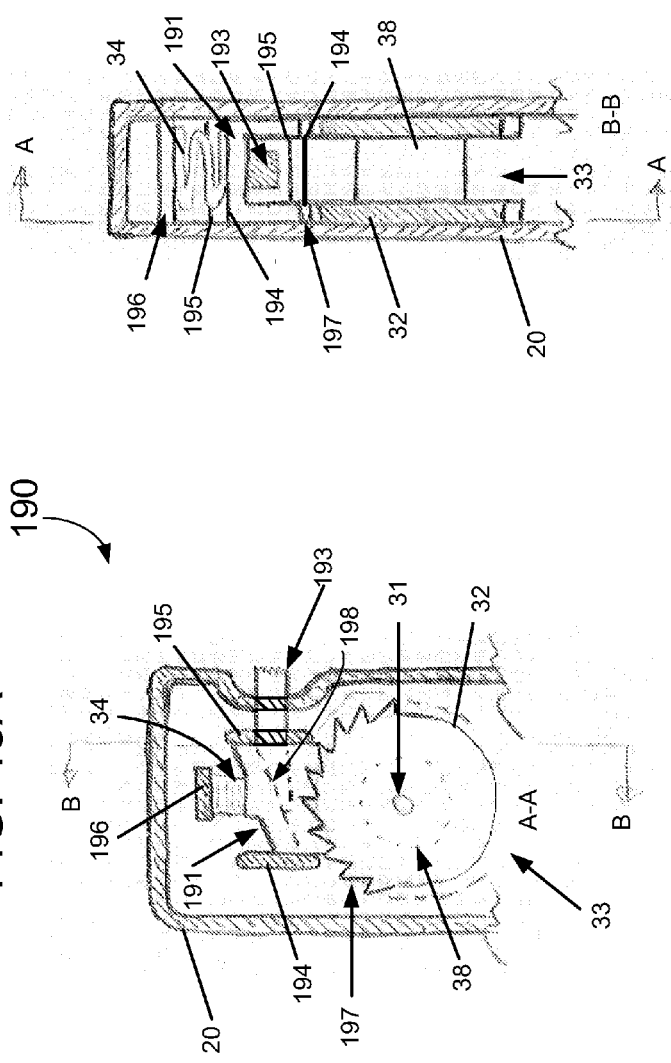
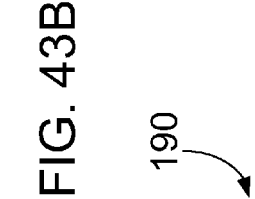
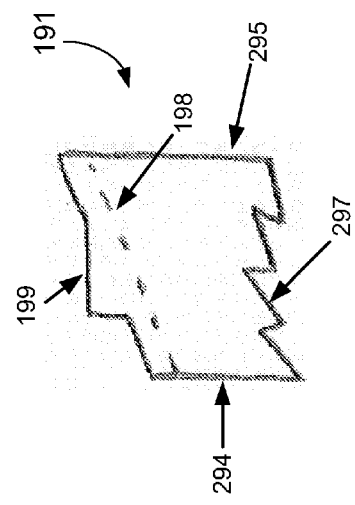
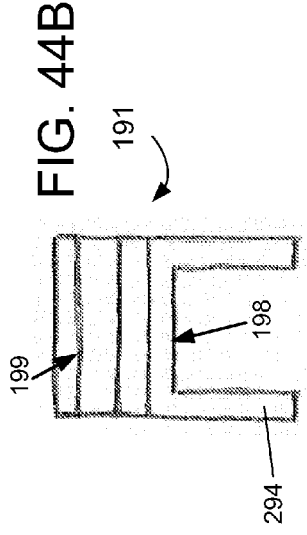
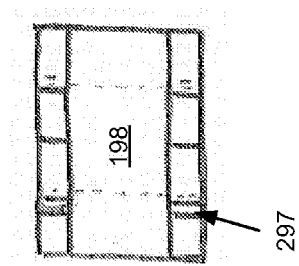

SYSTEM AND MECHANISMS PROVIDING AN ADJUSTABLE PERCH FOR A WEARER OF A HOLDER BASE WITH DEVICE

CROSS-REFERENCE TO RELATED APPLICATIONS

The present application claims the benefit under 35 U.S.C. §119(e) of U.S. Provisional Patent Application No. 61/430,130 to the inventor, filed Jan. 5, 2010, the entire contents of which is hereby incorporated by reference herein.

This application is related to the inventor's co-pending application Ser. No. 12/683,428, filed Jan. 6, 2010 and entitled "HOLDER SYSTEMS FOR MOBILE DEVICES", portions of which is hereby incorporated by reference herein and which has been specifically referred to in the detailed description below.

BACKGROUND

1. Field

Example embodiments in general relate to a system and mechanisms for providing an adjustable perch for a wearer of a holder base for devices such as cellular phones, pagers, PDAs, tools, equipment, identification cards, etc., and the like.

2. Related Art

Article holder systems employing retraction exist for a wide variety of devices, users, and usages. Conventional holder systems have been developed for tools and other devices in shop environments mounted on stationary fixtures; for clippers or scissors on the vest of a person fly fishing; for badges on mobile people like IDs for workers or ski passes for skiers; for keys; for power cords on a mobile electrical vacuum cleaner; etc. Many of these conventional holders employ a constant retraction force, e.g., not suspended. Keys held by such a retraction holder cannot be extended and used even though constantly subject to the retraction force.

Other conventional retraction holders employ a locking mechanism, so that as the cord is extended and permitted to retract, the locking mechanism engages and the retraction force is suspended. In configurations where the cord retracts around a spindle, the opportunity to suspend the retraction force exists once per revolution of the spindle. In such cases the length of the extended cord upon suspension of the retraction force is a function of the length of the cord wrapped on the spindle. In other words, taking an example where the cord wrapped on the spindle has a length of roughly 3 units, then the cord can be extended and retracted to locking positions (i.e., positions without the suspension force) at approximately 3, 6, and 9 units, etc., given enough cord length. Conversely, the cord cannot be extended and held without the retraction force at a non-multiple, i.e., 4 units.

Also, engaging the locking mechanism for any particular extended length requires extending the cord past that length by less than a full perimeter length, and then allowing retraction which engages the locking mechanism. For example, if the cord is extended to 10 units it will lock at 9 units. Changing the extended un-tensioned length from 9 units to 3 units requires pulling the extended cord past 9 units, and then retracting it to less than 3 units to reset the locking engagement mechanism, extending past 3 units to re-engage the locking mechanism, and retracting to 3 units, etc. This can become tedious, requiring undesirable and/or unnecessary steps by the wearer.

SUMMARY

An example embodiment is directed to a system having a base adapted to hold a device which is removable therefrom, a retractor mechanism coupled to the base and having a retractable cord wound thereon with both ends extending therefrom through at least one opening in the base as a line part of the retractable cord for access by a wearer of the base, and setting means providing adjustability of a perch position on the wearer for the base.

Another example embodiment is directed to a system providing an adjustable resting position for a wearer of a holder having a removable device therein. The system includes a generally rectangular base having sides and a backing to hold the device, a retractor mechanism coupled to the base and having a retractable cord wound thereon with both ends extending there from through at least one opening in the base as a line part of the retractable cord for access by the wearer. The system includes at least one stopper on a line part of the retractable cord to provide an adjustable resting position on the wearer without repeated adjustment of the cord or retractor mechanism.

Another example embodiment is directed to a system providing an adjustable perch for a wearer of a holder having a removable device therein. The system includes a base having sides and a backing to hold the device therein, the base including a pair of spaced cord ports at an upper end thereof, and a retractor mechanism retained within a retractor housing that forms part of the base and having a retractable cord wound thereon with both ends extending there from through a corresponding cord port as a line part of the retractable cord for access by the wearer. The system includes at least one stopper on a line part of the retractable cord, a stop rest formed as an indentation in spaced relation to a corresponding cord port, each stop rest having a channel formed there through, and a slot extending between a corresponding cord port and stop rest. The stopper is engagable to the stop rest to prevent further retracting of the cord so as to set the perch upon cord retraction to the retractor mechanism.

BRIEF DESCRIPTION OF THE DRAWINGS

Example embodiments will become more fully understood from the detailed description given herein below and the accompanying drawing, wherein like elements are represented by like reference numerals, which are given by way of illustration only and thus are not limitative of the example embodiments herein.

FIG. 1A is a rear perspective view of a system for providing an adjustable perch for a wearer with a cord/line parts in the fully retracted position in accordance with an example embodiment.

FIG. 2 is a bottom plan view of the system of FIGS. 1A and 1B.

FIG. 3 is a sectional view taken along line B-B in FIG. 2.

FIG. 4 is an end-on view from the top side end of the system of FIGS. 1A and 1B with the device removed.

FIG. 5 is a left-side elevational view of the system of FIGS. 1A and 1B.

FIG. 6A is a partial perspective view of an upper end of a part of the system of FIGS. 1A and 1B to illustrate a at stop state.

FIG. 6B is an enlarged version of the dotted circle in FIG. 6A to illustrate constituent components in more detail.

FIG. 7A is a top plan view of part of the system to show the port, stop rest, slot and channel in more detail.

FIG. 7B is sectional view taken along line A-A in FIG. 7A.

FIG. 7C is a sectional view taken along line B-B in FIG. 7A.

FIG. 8 shows another example embodiment of the system in an extended state.

FIG. 9 shows the system of FIG. 8 in a at stop state.

FIG. 11 is a perspective view of a stopper for the line cord in one example embodiment.

FIG. 12A is a rear plan view of the stopper in FIG. 11.

FIG. 12B is a sectional side view taken along line A-A in FIG. 12A (rotated).

FIG. 12C is a sectional end view taken along line B-B in FIG. 12A.

FIG. 13A is a left side view with the stopper of FIG. 11 in a closed position.

FIG. 13B is an end view with the stopper of FIG. 11 in a closed position.

FIG. 13C is a right side view with the stopper of FIG. 11 in a closed position.

FIG. 14A is a top plan view with the stopper of FIG. 11 in an open position.

FIG. 14B is a side profile view with the stopper of FIG. 11 in an open position.

FIG. 14C is an end view with the stopper of FIG. 11 in an open position.

FIG. 16A is another top plan view of the stopper of 15A.

FIG. 16B is a side elevational view.

FIG. 16C is an end view of the stopper.

FIG. 17 is a top plan view of a retractor mechanism configuration according to another example embodiment with certain components removed to illustrate selected components thereof.

FIG. 20 is a front plan view of the retractor mechanism of FIG. 17 with selected components removed to show specifics of the spindles and band in more detail.

FIG. 21 is a partial side view of selected components of the retractor mechanism of FIG. 17 to show additional detail thereof.

FIG. 22 is an enlarged view of a connection between the line cord and line part to show detail thereof.

FIG. 23 illustrates a cord to band interface with housing and retractor elements removed to show connective relationships of the retractor mechanism in FIG. 17 in more detail.

FIG. 24 is an illustration to show exemplary cord terminations in the band, according to the example embodiments.

FIG. 25A is a partial top plan view of the band to illustrate an example line cord termination in more detail.

FIG. 25B is a sectional view taken along line A-A in FIG. 25A.

FIG. 25C is a partial bottom plan view of the band to illustrate an example line cord termination in more detail.

FIG. 25D is a partial bottom perspective view of the band to illustrate an example line cord termination in more detail.

FIG. 26 is a top plan view of a retractor mechanism configuration according to another example embodiment with certain components removed to illustrate selected components thereof.

FIG. 27 is a partial cross-sectional view of a part of the retractor housing of the holder to illustrate the retractor mechanism of FIG. 26 in further detail.

FIG. 29A is a partial rear view taken along line B-B of FIG. 29B to show interior details thereof of a flex configuration for achieving an adjustable perch for the wearer according to another example embodiment.

FIG. 29B is a sectional end-view taken along line A-A of FIG. 29A to illustrate a partial top plan view of the base with selected interior components of the flex configuration thereof.

FIG. 30A is a partial side view of the base of the holder to illustrate a flex configuration for achieving an adjustable perch for the wearer according to another example embodiment.

FIG. 30B is a partial rear view taken along line A-A of FIG. 30A to show interior details thereof of the flex configuration.

FIG. 31A is a partial top plan view of the base taken along line B-B of FIG. 31B to illustrate a slider configuration for achieving an adjustable perch for the wearer according to an example embodiment.

FIG. 31B is a sectional view taken along line A-A of FIG. 31A to show a partial rear view with interior details thereof of the slider configuration.

FIG. 32A is a variant of FIG. 31A to illustrate another slider configuration for achieving an adjustable perch for the wearer.

FIG. 32B illustrates a profile view of the slider alone.

FIG. 32C illustrate an end view of the slider to show structural elements thereof in more detail.

FIG. 35A is a partial sectional view of an upper part of the base of the holder so as to illustrate a slider configuration for achieving an adjustable perch for the wearer according to another example embodiment.

FIG. 35B is a sectional view taken along line A-A of FIG. 35A, showing a partial bottom underside view of the base with interior details thereof of the slider configuration.

FIG. 35C is a top plan view of part of the base.

FIG. 36A is a sectional view taken along line B-B of FIG. 36C to show a partial upper rear corner view of the base of the holder so as to illustrate a slider configuration for achieving an adjustable perch for the wearer according to another example embodiment.

FIG. 36B is a sectional view taken along line A-A of FIG. 36A.

FIG. 36C is a partial top plan view of the base to show the port and slider tab in more detail.

FIG. 38A is a sectional view taken along line A-A of FIG. 38B to illustrate a brake assembly for achieving an adjustable perch for the wearer according to an example embodiment.

FIG. 38B is a partial rear view of selected components of the brake assembly with the base removed.

FIG. 38C is a sectional view taken along line B-B of FIG. 38A to illustrate components of the brake assembly in more detail.

FIG. 39A is a plan view of the brake guides and tab brake slot.

FIG. 39B is a sectional view taken along line A-A of FIG. 39A.

FIG. 40A is a front plan view of the brake.

FIG. 40B is a top plan view of the brake.

FIG. 40C is a side elevational view of the brake.

FIG. 43A is a sectional view taken from line A-A of FIG. 43B to illustrate a spindle brake assembly for achieving a fully adjustable perch for the wearer according to an example embodiment.

FIG. 43B is a sectional view taken from line B-B of FIG. 43A.

FIG. 44A is a top view of the spindle brake shown in FIGS. 43A and 43B.

FIG. 44B is a side view of the spindle brake shown in FIGS. 43A and 43B.

FIG. 44C is an end view of the spindle brake shown in FIGS. 43A and 43B.

DETAILED DESCRIPTION

Figure 1B:
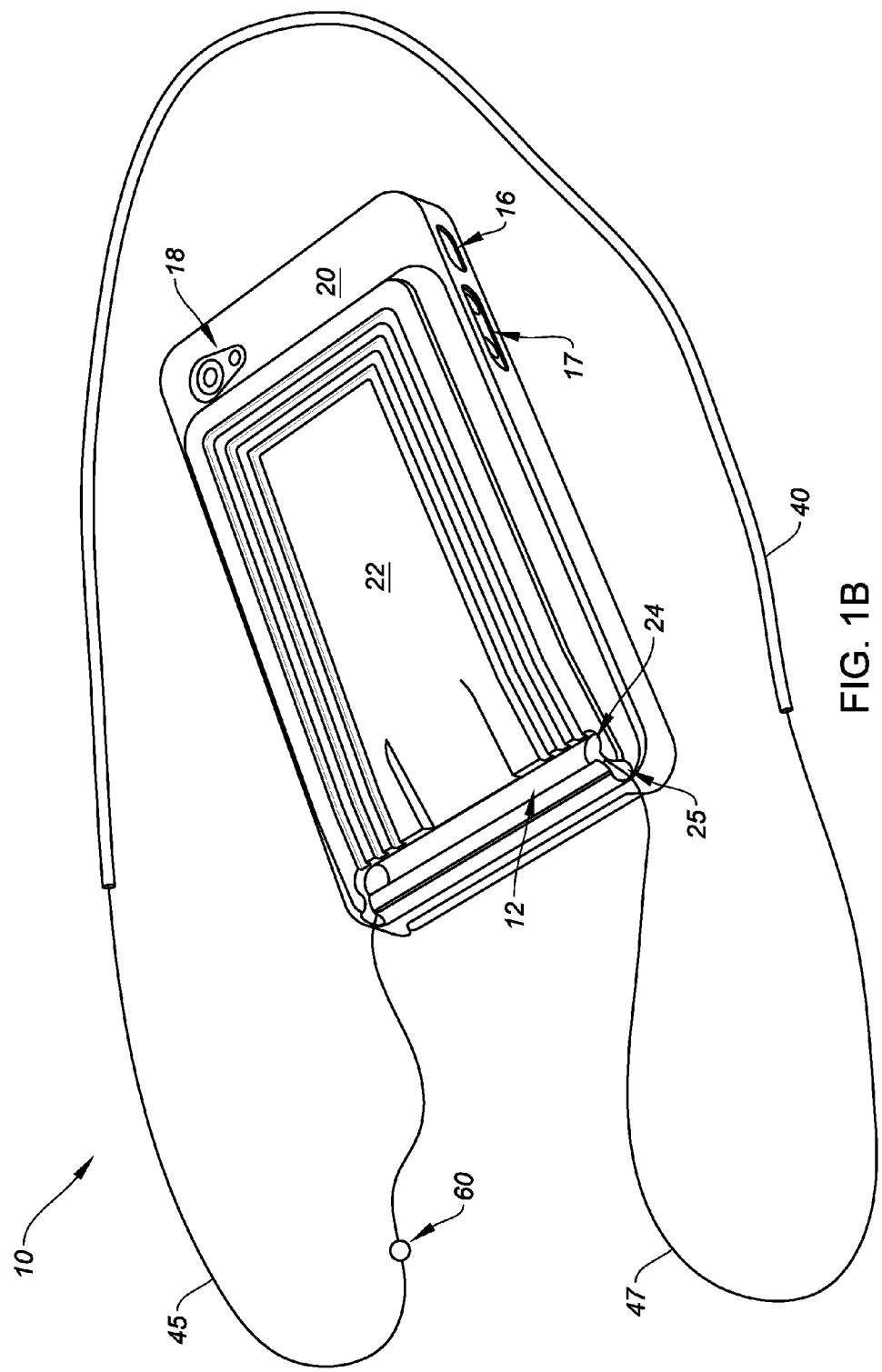
FIG. 1B is a rear perspective view of the system with the cord/line parts in an extended position out of the base.

As to be set forth more fully below, the example embodiments in general are directed to a system for holders which supports another device such that the device is maintained in a stable orientation on the wearer while engaged in use by the wearer's hand or while at rest in a holder or base of the system.

As to be set forth more fully hereafter, various example embodiments are directed to a system for providing an adjustable perch for a wearer that is for holders of devices such as a cell phones, mp3 players, tools, equipment, identification badges, bar-code readers, and the like. In some examples the holder base of the system is worn around a user's neck such that the device is suspended therein and at rest in front of the user's chest. The system may provide torque and/or force for a certain orientation of the device, and/or may use magnetic means to pull and/or retain (within limits) the device in an approximate position, even if the user bends over, for example. In the scenario where the device is suspended and somewhat retained in front of the user's chest, the device may be off, on, being referenced by somebody (e.g., the user may be looking at a display screen on the device.), active (e.g., the device may be an mp3 player and the user may be listening via headphones; or it may be transmitting, illuminating, etc.), and/or non-active.

As to be shown by one or more of the figures, the example systems may employ a single spindle, multiple-spindle (2 or more) retraction system and/or retractor mechanism, which may hold the weight of a device or a device-holder base combination in a retracted position (e.g. upon the wearer's chest). Here, the wearer's device can be easily reached, seen, and/or otherwise used by the user or others. In this scenario, for example, the wearer could easily reach and pull the device-holder combination away from the retracted position to execute a task or inquiry or such. The multi-spindle configuration may be effected for example by use of a band or other known method of retraction of a cord around multiple spindles.

As to be shown by one or more of the figures, the example systems may employ a cord with two diameters. In this respect, the smaller diameter occupies a portion of spindle winding area and forms the lower part of total cord length. The larger diameter portion provides comfort around the neck and forms the upper part of the total cord length.

As to be shown by one or more of the figures, the example systems may employ a wide array of variable set stops or "stoppers" on the cord. The usage of stoppers can be set optionally on the cord in such a position as to set a convenient or desired resting position or "perch", and may be small enough to be retracted into the base/housing and around the spindle(s). As each design can be injection molded plastic with 'living hinge', "snap fit", "press fit", and/or "cam action" when squeezed closed over or onto the cord such that the stopper does not slide on the cord and provide for halting the retraction when the stopper comes to a stop rest during normal usage retraction.

The system(s) may include a retractor mechanism, which may hold the weight of a device or a device-holder base combination in a retracted position (e.g. upon the user's chest). Here, the device can be easily reached, seen, heard, and/or otherwise used by the user or others. In this scenario, for example, the user could easily reach and pull the device-holder base combination away from the retracted position on the chest to execute a task or inquiry or such. When the user is ready, the retractor mechanism may facilitate and/or cause return of the device-holder base combination to its retracted position by providing a retraction force and/or torque.

The example system and/or configurations of the system hereafter described may include means to suspend, and to un-suspend, the retraction force and/or torque, e.g., such that the retraction force and/or torque is suspended when the device-holder base combination is extended for use and then unsuspended in order to facilitate, guide, or cause either return to a partially retracted position upon the completion of the task, or full retraction.

One or more magnetic elements may be employed to maintain the device/holder base combination close to or against the wearer's body while the wearer moves around, travels, and/or bends over. In other words, the device/holder base combination would not tend to swing about as the wearer moves. In some examples, some of the magnetic elements may be on or inside the wearer's garments or otherwise secured to the wearer, while other elements are within the device/holder base combination. Clips, Velcro® fasteners, etc., may also be used to assist with such a function.

As used herein, the term "base" or phrase "holder base" will generally refer to an item that in addition to supporting a device, object or article (synonymous herein) such as a mobile phone (or mobile device or tool/non electronic device) or a holder base with a mobile device or tool/non electronic device therein, also contains retraction and locking functions, although the retraction and locking functions may be separated into different mechanisms or components. In an example scenario of a common user of a cell phone traveling on land, "retraction" will generally but not exclusively entail a force to retract the cord into the base, whereas "retention" will generally but not exclusively entail a force to secure or retain the holder base to the wearer or from swinging about freely on the wearer. "Retraction" and "retention" may entail other forces and/or torques.

As used herein, the term "holder" will generally refer to an item configured to hold or support a mobile device or tool/non electronic device for use by a user or wearer of the mobile device or tool/non electronic device. A holder may include the holder base or base described above and/or may be integrated with the base. A holder may be employed without a base.

As used herein, the phrases "retractor mechanism" and/or "retraction/locking mechanism" will generally refer to an item or apparatus that performs functions including: enabling a retractable line connected to a holder base with device therein to be paid out under user action; locking of the line in a desired position, and retraction of the line upon release thereof by the user. The phrases as described are not meant to limit the component(s) in any way. Retraction and locking may be addressed by different components and/or different means; retraction and locking functions may be separated into different items. In some examples a locking means may be omitted (i.e., when the device and/or base are pulled out they may be always under tension). In some examples, the tension created by retraction may or may not support the weight of the device and/or base combination.

In some examples, the retraction force and/or torque may be applied through one or more combinations of lines, cords, fibers, ribbons, tubes, wires, chains, etc. In some examples the locking function may be accomplished with springs, counterweights, electromechanical and/or mechanical devices, a manual button, suction, inertia, gravity, magnetism, gears, pads, circuits, etc.

As used herein, the term "perch" refers to the position or place where the object (such as the holder with device therein) is at rest on the wearer, i.e., a "resting position". The example embodiments in one aspect are directed to enabling the wearer to set the desired perch with great facility, i.e., in a way that is not cumbersome to the wearer. In another aspect, an example embodiment is described in which the wearer sets the desired perch position just once or very infrequently.

The example embodiments to be described hereafter provide a number of configurations and/or assemblies which enable the wearer to easily and without much effort adjust and set a desired perch for the object/article/device of interest, such as the base holder with device therein. Thus, upon retraction of the device and base after extension and use, the device in its base can simply be returned to the set perch position without further adjustment or manipulation.

As will be shown in more detail hereafter, the example embodiments provide various subsystems and/or mechanisms to realize an easily adjustable perch. These may be described as embodiments which include some type of stopper on cord adjustment (inclusive of landing, flex and slider configurations or embodiments) and/or an embodiment employing a spindle brake. These embodiments provide a fully variable adjustable perch. A perch achieved with a non-stopper embodiment (brake assembly) is also described which provides incremental perch positions.

As to be shown by one or more of the figures, one or more of the example embodiments for attaining a fully adjustable perch employ a stop-rest feature, slot, channel and a port feature. These components in conjunction with a stopper, as illustrated in detail, may be used by the wearer to allow any perch position to be set while maintaining the function of simple (e.g., no additional steps) and complete retraction.

FIG. 1A is a rear perspective view of a system for providing an adjustable perch for a wearer with a cord/line parts in the fully retracted position in accordance with an example embodiment; FIG. 1B is a rear perspective view of the system with the cord/line parts in an extended position out of the base; FIG. 2 is a bottom plan view of the system of FIGS. 1A and 1B; FIG. 3 is a sectional view taken along line B-B in FIG. 2; FIG. 4 is an end-on view from the top side end of the system of FIGS. 1A and 1B with the device removed; and FIG. 5 is a left-side elevational view of the system of FIGS. 1A and 1B.

Referring to FIGS. 1A-5, system 10 includes a holder base 20 (hereafter "base 20") which has an integral bump or forming a retractor mechanism housing 22 (hereafter "retractor housing 22"). Retractor housing 22 has a cavity 28 which contains a retractor mechanism having one or more spindles (not shown). Base 20 includes a side facing 23 which has optional apertures 16 and 17 for device 15 function buttons. Cavity 19 also optionally includes a thumb depression 13 which enables the wearer to facilitate grasping cord 40 out of a recess (not shown) to extend the retractable cord out of the base 20. Base 20 further includes an optional aperture 18 for access to another device 15 action button (such as power).

Base 20 and retractor housing 22 can be fabricated from a metal material which may or may not have magnetic properties. Alternatively these components can be made of a non-ferrous material such as aluminum or as a one-piece article formed from an extruded or molded material such as a polycarbonate or ABS, or a blend thereof, and can be configured to include a magnet or magnetic material embedded therein or attached thereto for removable attachment of the base 20/retractor housing 22 to retention means on the wearer. In an example, the edge lips 21 can have a molded rubber article or film formed thereon to improve a gripping function thereof.

Arrow 15 designates the device 15. The system 10 herein is configured such that the device 15 may be read by the wearer whether in a resting or static position or as it is raised or extended. Moreover, the device 15 is configured to sit upside down within a cavity 19 formed in the base 20 so that as the wearer wears or raises the base 20 the device 15 is always readable. The device 15 clicks into the base 20 so it is secured within cavity 19 via edge lips 21. In alternative constructions the device 15 may be configured to slide into cavity 19, or one end of base 20 may be formed as a removable end cap that may be temporarily removed for insertion of the device 15 and then replaced to secure the device 15 therein. The device 15 may also be secured to base 20 or a holder via any of adhesion, straps, screws, etc. The base 20 is also height adjustable relative to the wearer's chest.

Device 15 may be an electronic device such as a cell phone, PDA, calculator, mp3 player, IPOD®, fluke, medical diagnostic device, or bar-code reader. Device 15 also could be a tool, notepad, binoculars, or other non-electronic article or object which is secured in the cavity 19 of base 20. In an alternative embodiment, the device 15 may be integrated and/or incorporate features of system 10, inclusive of retractor mechanisms and/or setting means for automatically or incrementally setting the perch for the wearer of the device. In other words, the device 15 or device housing itself can be designed at time of manufacture to include the mechanisms described as part of the example system 10 herein, to include the associated configurations for setting an adjustable perch to be explained in more detail hereafter.

The system 10 includes line parts 45 and 47 which are connected to a retractor mechanism (not shown) within the cavity 28 of retractor housing 22. Each line part 45/47 may be attached to a larger diameter neck cord 40. Alternatively, the retractable cord (neck cord 40 and/or line parts 45/47) may be of a single diameter, i.e., a single-diameter cord or lanyard may be used. In one example, each line part 45/47 may include a stopper 60 thereon, or only one line part 45/47 may have a stopper 60 thereon. FIG. 1A shows the line parts 45/47 fully retracted onto one or more spindles of a retractor mechanism within retractor housing, so that only a part of the neck cord 40 is shown in a recess 12 between openings in base 20, also referred to herein as cord ports or ports 24. Thus, in one example each line part 45/47 is retracted/extended through a dedicated port 24 and stop rest 25, except the stopper 60 which cannot pass through the channel 26 (only the port 24). A slot 27 is arranged between each corresponding port 24 and stop rest 25. FIG. 1B shown the system 10 with the cord/line parts 40/45/47 in an extended state, in which the recess 12 between ports 24 can be more clearly seen. Operation of retraction and extension to set the perch is described in more detail hereafter.

The larger diameter neck cord 40 and smaller diameter line parts 45/47 may be made of a suitable woven or non woven material, natural or synthetic, including but not limited to cotton or terry cloth or a combination of terry cloth made with filaments of one or more of cotton, polyester, polyimide, polyurethane, and a microfiber, leather, chamois, bamboo or combinations of materials with filaments thereof. The neck cord 40 may be made of a softer, thicker material as desired for comfort. As to be described hereafter, the line parts 45/47 may be woven into the cord 40 to form a cord/line part joint. The length of the line parts 45/47 paid out should be sufficient to enable the wearer to easily view and operate the device 15; an example length being at least 20 inches or more for example. The length of neck cord may be between about 8 to 13 inches as an example.

FIG. 6A is a partial perspective view of an upper end of a part of the variable set-stop retractor system; FIG. 6B is an enlarged version of the dotted circle in FIG. 6A; FIG. 7A is a top plan view of part of the system to show the port, stop rest, slot and channel in more detail; FIG. 7B is sectional view taken along line A-A in FIG. 7A; and FIG. 7C is a sectional view taken along line B-B in FIG. 7A.

Referring to FIGS. 6A to 7C, and in one example, these views are provide to show an embodiment of the system which enables the wearer to easily and without much effort adjust and set a desired perch for wearer wearing the object of interest, such as the holder base 20 with device 15 therein. As previously discussed, these views describe a type of stopper on cord adjustment referred to herein as a "landing" configuration which provides the wearer a fully adjustable perch, e.g., a resting position which can be fully set by the user. Moreover, the landing configuration described in these views provides the wearer an automatic perch; i.e., a perch such that the wearer simply guides retraction until the retraction force terminates at the perch (e.g., desired resting position).

To set the perch, the wearer may grab the cord/line parts 40 at the thumb ridge 12 so that the stopper 60 is pulled out of the base through port 24 and clear of base 20. The wearer then gives a little tug to ensure line parts 45/47 is fit into the slots 27 so that they are guided into the channels 26 of the rest stops 25. The wearer can then pull the cord/line parts 40/45/47 all the way out; the line parts 45/47 will hold in channels 26 regardless of the orientation of the base 20. In a working example, the wearer may then put the cord 40 around their neck (or not), and/or pick up the base 20 with device 15 and begin usage of the device and stop rests 25 (and thereafter place the cord 40 around their neck). Assuming that the wearer had previously set at least one stopper 60 on a line parts 45/47 previously to where they want to set the perch, once usage of the device 15 is done, the wearer simply gives a little pull on the line parts 45/47 collectively or the neck cord 40 (not shown, but each end connected to a line part 45/47) to engage retraction of a spindle inside the cavity 28 of retractor housing 22 (see FIG. 3 for example). The spindle of the retractor mechanism retracts the line parts 45/47 via channels 26 formed through the stop rests 25 onto spindle(s), until the stoppers 60 hit the stop rests 25, thereby setting the perch for wearing on the user's chest in this example. This perch is now automatically set for repeated use of device 15 in holder base 20.

FIG. 8 is another example embodiment of the system showing the system in an extended state, and FIG. 9 showing a at stop state. FIGS. 8-9 are directed to a prototype system to further describe the landing configuration for an adjustable perch and/or automatic perch. FIGS. 8-9 differ slightly from FIGS. 6A-7C in that the landing configuration is arranged on the retractor housing 22 instead of at the top of base 20.

In the extended state, a wearer has grasped cord 40 out of recess 12, pulled it through slots 27 and stop rest 25 out to its full extension (or a point where automatic retraction is disabled). FIG. 9 shows a stop state where at least one of the stoppers 60 has been set on cord 40 and has engaged the stop rest 25 to set the perch. Of course, if two stoppers 60 are optionally used, the wearer may adjust both stoppers 60 so that the system 10 would lay at the desired perch with both stoppers 60 engagable to corresponding stop rests 25.

Figure 10A:
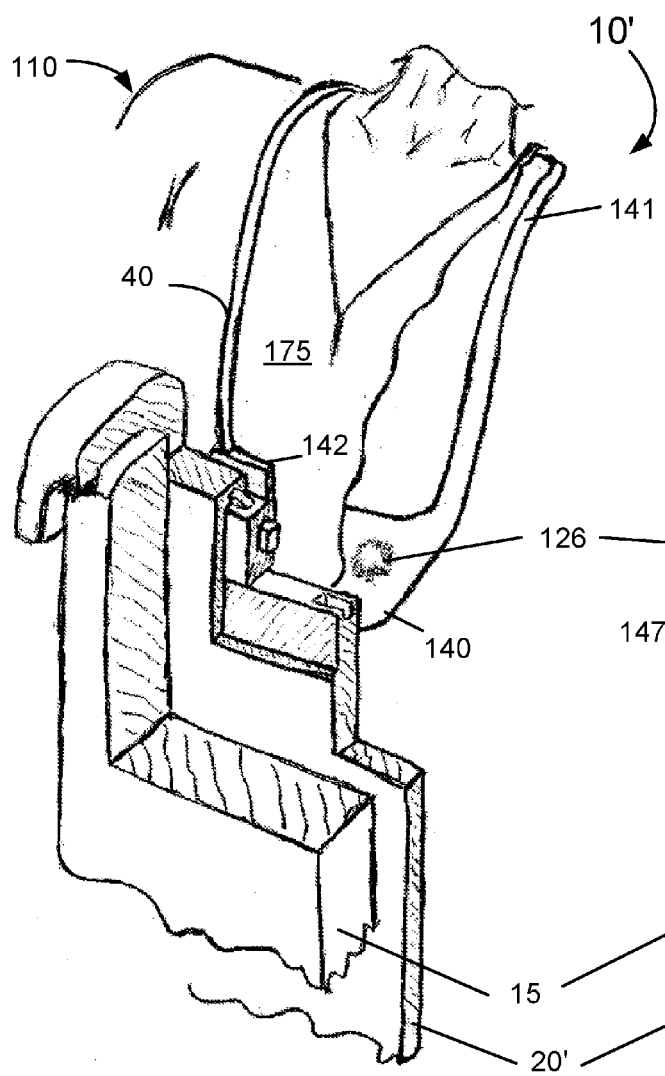
FIG. 10A is an enlarged partial system view to illustrate a holder to pendant connection arrangement in accordance with another example embodiment.
Figure 10B:
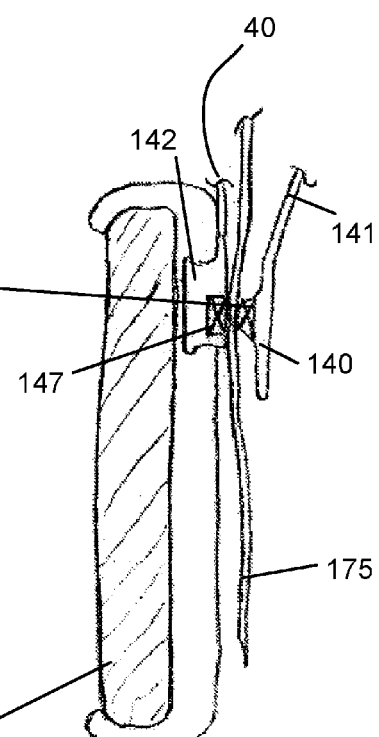
FIG. 10B is a cross-sectional view to show magnet-to-magnet connections.

FIG. 10A is an enlarged partial system view to illustrate a holder to pendant connection arrangement in accordance with another example embodiment, and FIG. 10B is a cross-sectional view to show magnet-to-magnet connections. The following description with regard to the using of magnets or magnetic material to secure a holder (or base holder) to a wearer is adapted from the inventor's co-pending U.S. application Ser. No. 12/683,428, filed Jan. 6, 2010, (hereafter, the '428 application") the relevant portions incorporated by reference herein. The following discussion is applicable to the system shown in any of the previous FIGS. 1-9.

FIG. 10A shows a partial perspective/front view of a holder 20' of a holder system 10' worn on a person 110 with an enlarged partial cutaway view of the holder/device interface, in order to better illustrate the connective relationship between an electronic device 15, holder 20' of holder system 10' and pendant 140. In FIGS. 10A and 10B, only a portion of the system 10' is thus shown and various components removed with other components enlarged for purposes of clarity.

The person 110's right shoulder shows the cord 40 coming down over the apparel 175 (shirt). The person 110's left side shows the pendant strap 141 coming down beneath the shirt 175 and terminating at pendant 140 beneath the shirt. The pendant magnetic element is generally shown at 146.

In this example, the device-side connector is integrally formed as part of holder 20' (retractor housing not clearly shown) and the base-side connector 142 is secured via press-fit engagement therein. The base-side connector includes magnetic element 147. The pendant 140 on the inside of shirt 175 has a bulbous protrusion formed as pendant magnetic element 126. This arrangement secures the shirt 175 between the magnetic elements 126 and 147, preventing the pendant 140 (and device 15/holder 20' combination attached thereto) from swinging loosely on the person 110's chest.

FIGS. 10A and 10B illustrate the use of a pendant 140 as retention means for the example holder 20' shown in these figures. However, the co-pending '428 application notes that a magnetic shirt clip, button, and/or a chest strap could be configured with a magnet or magnetic material for use in conjunction with magnets on holder 20' and or the rear thereof.

Consequently, within the normal activities for which the particular example system is designed, e.g. calmly bending over while using the example system described in above, the mobile device may be prevented from swinging about any more freely than that allowed by whatever the user is wearing and by which the part (clip, button, chest strap, and pendant) is held or contained. In the case of chest strap, which may be a strap worn snugly around the user's chest, the device is held more securely.

Moreover, various combinations of magnet and ferrous material or steel are conceivable. For example, in one example only the outer part of a button contains a magnet while button part and the holder 20' (or mobile device, or device/holder combination in other embodiments) has a piece of ferrous material. In another example, both sides of a button could contain a magnet or magnetized element therein. Magnetic-based means of retention may provide the benefit of not harming apparel, whereas a tradition tie pin does not.

Other retention means are envisioned such as clips, Velcro®, knob and socket, etc., where such items are provided at an interface between the device, device/holder combination, or holder 20', and a shirt clip for example. These alternative retention means could be used in conjunction with retention means other than the shirt clip in order to fasten to apparel or otherwise be connected to a person or station, e.g. chest strap worn above the other apparel, or a safety pin which includes a surface sufficient to hold Velcro®, or an item like a traditional tie pin which penetrates the apparel and supplies a surface to which Velcro® may be attached.

Moreover, the retention function may be expanded to include withdrawal or retraction of the electronic device or device/holder combination, in addition to preventing it from swinging about for example when a user is bending over, or from hanging loosely for example if the device is a tool or instrument in a work area or a windy area. Such expanded functions may be addressed by a cord and retraction mechanism (e.g. a retraction mechanism is attached to the user's clothing at the chest and its cord is attached to and extended with the device) a cord, pulley, and counter weight; elastic material; spring; suction; etc. In such cases, a retraction mechanism(s) assumes the majority of the weight of the device and/or provides one or more dimension(s) of retraction and possibly orientation and/or alignment, while a second or more retraction mechanism(s) provides a retention function.

In operation, the wearer begins by donning one of the retention parts. An electronic device 15 may be "clicked" into the holder 20' by simply aligning it and applying a little pressure. Other means of joining the device 15 and holder include screws, slots, Velcro®, etc. These steps may happen in different order(s).

In some scenarios, such as when the wearer wants to interact with the device 15, e.g. to dial a phone number or take a call on a cell phone, or to select and play a certain album on an mp3 player, the wearer simply grabs the device 15 and pulls it to an appropriate position. The retention force, between the holder 20' and the pendant 140 for example, is easily and essentially "broken" by the wearer pulling and extending the device 15 and holder 20' away from his/her body and clothing.

In an example, a wearer is talking on the phone while holding the device 15 and holder 20' to his/her ear and getting into a taxi. In another example, a retail salesperson is showing the display of the device 15, which is still in the holder 20', to a potential customer who is interested in shoes. Upon extending the device 15 and holder 20', the wearer may perform a step such as pushing a button on the holder 20' to suspend the retraction force and/or torque, as in some example embodiments, or the suspension of the retraction force and/or torque may happen automatically under a brake (as in other example embodiments), or it may not happen at all (the holder 20' must be held under tension) as it remains under a retraction force and/or torque.

Upon completion of the task, the device/holder-base combination is returned to its retracted position. This may happen in one of several ways. In one example the wearer releases a button on the holder 20' to re-engage the retraction force and/or torque if it was suspended. The retraction force and/or torque then assists the wearer with retraction and orientation of the device 15/holder 20' combination, or it may retract and orient the device 15 into the proper retracted position without wearer participation. How this happens to achieve a desired perch has been described with regard to the landing configuration, and shall be described with regard to other example embodiments in further detail hereafter.

FIG. 11 is a perspective view of a stopper for the line cord in one example embodiment; FIG. 12A is a rear plan view; FIG. 12B a sectional side view taken along line A-A in FIG. 12A (rotated); and FIG. 12C a sectional end view taken along line B-B in FIG. 12A.

Referring to FIGS. 11 to 12C, the stopper 60 fastens to the cord 40 (or line parts 45/47) firmly. The stopper 60 opens and can thus be moved, when a fingernail or such is inserted into groove 61.

FIGS. 13A-13C shows the stopper 60 in a closed position; FIGS. 14A-14C shows the stopper 60 in an open position. To fasten the stopper 60 to the cord 40, the portion of the cord 40 (where the wearer desires the stopper 60 at to set the perch) is laid in the cord slot 65. The stopper 60 is hinged at 62. Tab 63 is pushed to lock the cord 40 into chamber 64.

Figure 15C:
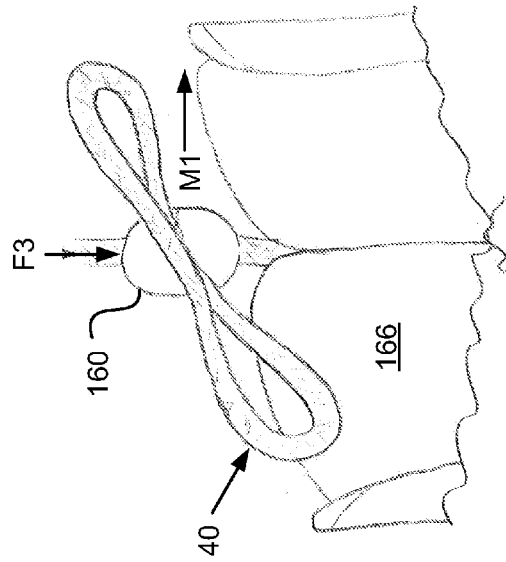
FIG. 15C is a top plan view of the stopper of FIG. 15A showing line cord adjustment.
Figure 15D:
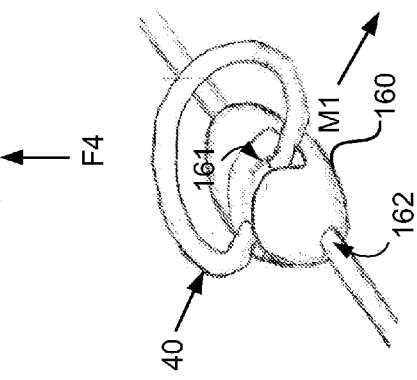
FIG. 15D is a perspective view of the stopper in a dynamic or movable orientation.
Figure 15A:
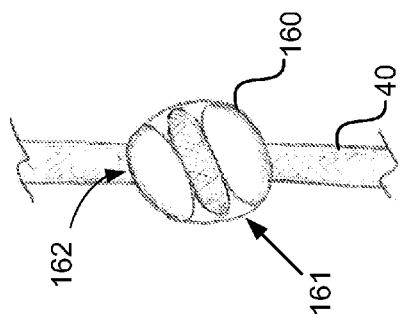
FIG. 15A is a top plan view of a stopper for the line cord in accordance with another example embodiment in a static position.
Figure 15B:
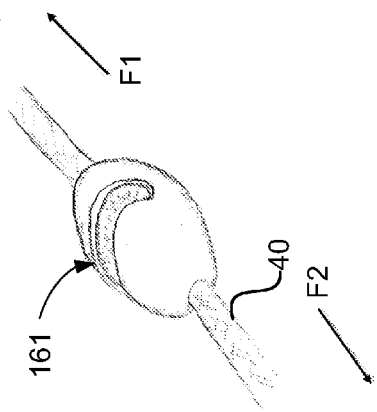
FIG. 15B is a perspective view of the stopper of FIG. 15A.

FIG. 15A is a top plan view of a stopper for the line cord in accordance with another example embodiment in a static position; FIG. 15B is a perspective view; FIG. 15C is a top plan view showing line cord adjustment; and FIG. 15D is a perspective view of the stopper in a dynamic or movable orientation. Referring to FIGS. 15A-15D, the stopper 160 has a central transverse slot 161 to receive a portion of the cord/line parts 40/45/47 therein and holes 162 which receives the cord/line parts 40/45/47 there through. FIGS. 15A and 15B show the stopper 160 in a static state with the arrows showing opposing tensile forces F1 and F2 on cord 40. To adjust stopper 160, opposing forces F3 and F4 may be imposed by the wearer's fingers 166 to push loose cord cord/line parts 40/45/47 up through the slot 161 for adjustment, causing a side force M1 (see FIGS. 15C and 15D). This allows the stopper 160 free movement along the cord to set or rest the perch.

FIG. 16A is another top plan view of a stopper of FIG. 15A; FIG. 16B is a side view, and FIG. 16C an end view of the stopper. As shown in FIGS. 16A-16C, holes 162 turn away from one another at either end (see FIG. 16A for example, top and bottom) and the stopper 160's transverse slot 161 can be seen to have a neck down and/or have a thinner dimension d2 in order to hold the cord 40 via friction while in usage, and with a wider dimension d1 at the slot ends. The holes 162 have the same dimension d1 as the outer ends of transverse slot 161. The cord/line parts 40/45/47 may be curved/crimped and reoriented between slots 161 and 162 (see FIGS. 16A and 16B). The stopper 160 may be asymmetrical to facilitate cord/line parts 40/45/47 ejection/retraction and/or adjustment.

FIGS. 17-27 are provided to illustrate various single and multi-spindle retractor mechanisms applicable to system 10 in accordance with the example embodiments. These retractor mechanisms may interact with locking means enabling the wearer grasping the base 20 to lock the line elements 45, 47 in a desired resting position (perch) for use of the device 15. Various configurations to be described hereafter shall describe achieving an automatic perch with any of the following retractor mechanisms in which a stopper is employed in conjunction with the configuration to achieve the automatic perch and also provide the locking function for the system 10. Another embodiment is described which may employ any of the following retractor mechanisms to enable the wearer to achieve an incremental perch without the use of stoppers on line parts 45/47.

Figure 18:
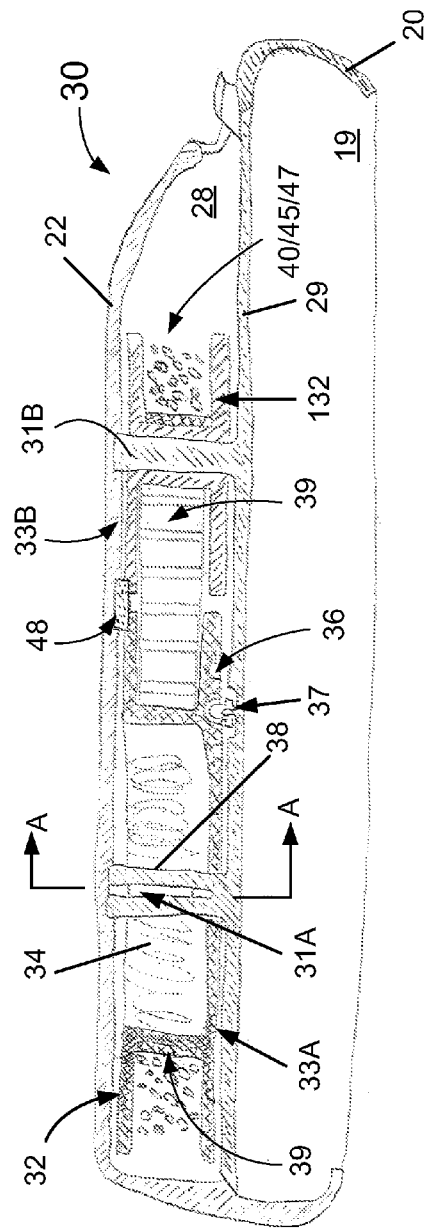
FIG. 18 is a cross-sectional view of the retractor mechanism of FIG. 17 illustrating selected components thereof.
Figure 19:
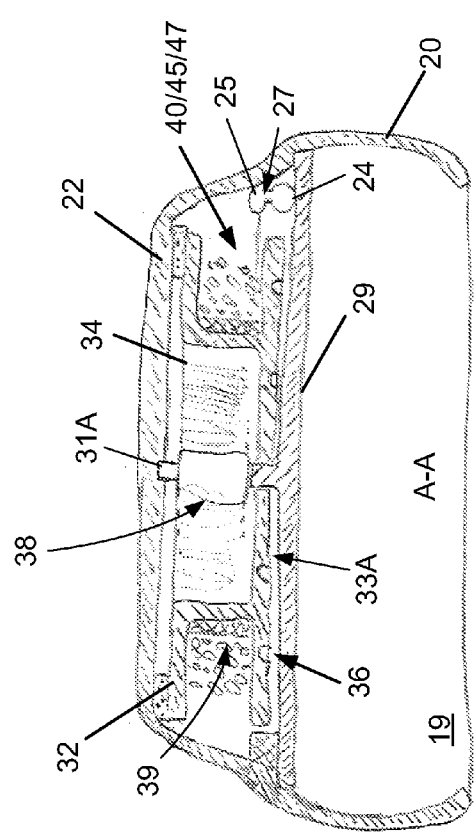
FIG. 19 is a sectional view taken along line A-A in FIG. 18.

FIG. 17 is a top plan view of a retractor mechanism configuration according to another example embodiment with certain components removed to illustrate selected components thereof; FIG. 18 is a cross-sectional view of a retractor mechanism configuration according to an example embodiment illustrating selected components thereof; FIG. 19 is a sectional view taken along line A-A in FIG. 17. FIG. 20 is a front plan view of the retractor mechanism of FIG. 17 with selected components removed to show specifics of the spindles and band in more detail; and FIG. 21 is a partial side view of selected components of the retractor mechanism to show additional detail thereof.

Referring to FIG. 17-19, features to set the perch on the base 20 for the system 10 as shown in any of FIGS. 1-10 are not shown for clarity; these views are provided to show a retractor mechanism 30 within the cavity 28 between the retractor housing 22 and a plate 29 which forms part of the base 20 and serves as a backing for the cavity 19 that houses device 15 therein. Additionally, routing posts which route the line parts 45/47 and cord 40 onto spindles are omitted in some of the figures for clarity.

In FIG. 17, a retractor mechanism 30, which may be configured for system 10 as shown in any of FIGS. 1-10, is shown with several of the components which form the perch in system 10 removed for clarity, as well as some of the components of the housing removed. Retractor mechanism 30 is arranged within retractor housing 22 to include a larger spindle 33A and a smaller spindle 33B. A series of cord routing guides 141 are arranged within the cavity 28 of the retractor housing 22 to guide the cord 40/line parts 45/47 onto a band 39 which encircles the spindles 33A/B and is bound by flanges 32 and 132 of the spindles 33A/B. Dotted lines 142 show a general path for the cord/line parts 40/45/47 in FIG. 17.

Referring to FIGS. 18 and 19, the retractor mechanism 30 may in one example include a "flat" double spindle configuration, with the primary spindle 33A rotating on axle 31A and the secondary spindle 33B rotating on axle 31B. In operation, axle 31A rides within hub 38. The spindle 33A has flanges 32 that bound cord 40 and line parts 45/47, which are taken up onto band 39 on the spindles 33A/B between the flanges 32. Band 39 wraps partially around both spindles 33A and 33B and is constrained within flanges 32 and 132. Drive spring 34 supply a torque to the spindle 33A which in turn exerts a wrapping force on the band 39. As to be seen hereafter, the force may be facilitated by mating teeth on the wrapping surface of the spindle 33A and/or on the band 39. Alternatively, the force may be exerted by rough surfaces (instead of teeth) or other means. The cord/line parts 40/45/47 attach to the band 39 so as to wrap around the spindle 33A as the band 39 and spindle 33A rotates with the axle 31A under spring 34 biasing. This allows the wrapping of cord/line parts 40/45/47 around multiple spindles 33A/33B.

Spindle 33A includes a locking pin track 36 and locking pin 37. Pin 37 floats freely in locking pin track 36. When the wearer pulls the cord/line parts 40/45/47 out, the pin 37 floats in the outer ring of track 36. As retraction begins and the spindles 33A/B rotate the other way, the pin 37 engages a fork to the inside and dead ends to terminate rotation of the spindles 33A/B, thereby locking the spindles. If the wearer pulls on the cord/line parts 40/45/47 again, the pin 37 drifts to the inner circle and upon cord/line parts 40/45/47 retraction, the pin 37 cannot reset in the dead-end as the spindle 33A rotates around and around, allowing the cord/line parts 40/45/47 to be fully retracted onto the band 39. Other means of locking the spindle 33A are known.

Additionally, a magnet 48 is shown in retractor housing 22. This is provided for attaching the base 20/housing 22 to the wearer, such as to a retention means worn on the wearer, as shown in FIGS. 10A/B for example (a pendant), or to a magnetized button, clip, band, etc on the wearer.

As best shown in FIG. 20, each spindle 33A/B has a corresponding axle 31A, 31B and a hub 38/138. The inner surface of band 39 has a toothed configuration which mates with geared teeth on hub 38. This ensures that as the hub 38 rotates, it pulls the band 39 and the band 39 will not slip. The drive spring 34 provides the torque which drives the spindle 33A, spindle 33B and hence rotates band 39 to take up cord/line parts 40/45/47 onto the band 39 being driven by both spindles 33A/B via drive spring 34.

The multi-spindle configuration has been shown to yield a lower profile retractor housing 22 as compared to a single spindle configuration. This is due to the ability to provide a greater cord wrap volume.

FIG. 22 is an enlarged view of a connection between the line cord and line part to show detail thereof; and FIG. 23 illustrates a cord to band interface with housing and retractor elements removed to show connective relationships of the retractor mechanism in FIG. 17 in more detail.

FIG. 22 illustrates that the line parts 45/47 may be weaved into the neck cord 40 so as to form a cord/line part joint 41. FIG. 23 shows elements of the cord 40, line parts 45/47 and connection to band 39. The dotted oval indicated by element 49 denoted the top end of base 21, i.e., where the line part 47 exits out of the port 24. A stopper 60 is shown on line part 47, this may be movable to set the perch; alternately there may be no stopper and the perch may be set by a brake, to be discussed hereafter. The cord-line part joint 41 is shown, as is a fastener 44 (such as a clip) to join the line parts 45/47. The line parts/45/47 must be terminated at the band 39. This is shown generally in FIG. 23.

The inner surface of band 39 has a toothed configuration which mates with these geared teeth. This is exactly as shown in FIG. 20 in the dual spindle configuration. As such, hub 38 on the axle 31A has a corresponding toothed gear configuration to mate with the toothed arrangement on the inner side of band 39.

FIG. 24 is an illustration to show exemplary cord terminations in the band, according to the example embodiments: FIG. 25A is a partial top plan view of the band to illustrate an example line cord termination in more detail; FIG. 25B is a sectional view taken along line A-A in FIG. 25A; FIG. 25C is a partial bottom plan view of the band to illustrate an example line cord termination in more detail; and FIG. 25D is a partial bottom perspective view of the band to illustrate an example line cord termination in more detail.

FIGS. 24 to 25D are provided to describe line part termination in band 39 in more detail. The toothed protrusion in band 39 can be seen in clearer detail in FIGS. 25B and 25D. FIG. 24 show several different possible terminations for one or both line parts 45/47 in the band 39. These are shown, for illustration purposes only, along a single stretch of band as termination examples 391 to 395. FIGS. 25A-25D show different views of termination example 393 in more detail in order to secure line parts 45 and 47 to band 39, which can be done at time of manufacture prior to joining the line parts at fastener 44.

As previously discussed, a "landing" configuration provides the wearer a fully adjustable perch, e.g., a resting position which can be fully set by the user. Moreover, the landing configuration provides the wearer an automatic perch; i.e., a perch such that the wearer simply guides retraction until the retraction force terminates at the perch (e.g., desired resting position).

FIG. 26 is a top plan view of a retractor mechanism configuration according to another example embodiment with certain components removed to illustrate selected components thereof; and FIG. 27 is a partial cross-sectional view of a part of the retractor housing of the holder to illustrate the retractor mechanism of FIG. 26 in further detail.

The embodiment shown in FIGS. 26-27 may be applicable to system 10 as shown in any of FIGS. 1-10, and is described with several of the components which form the perch in system 10 removed for clarity, as well as some of the components of the housing removed. Additionally, as many of the elements are identical to that of FIGS. 17-21, consistent numerology is used where feasible.

Referring to FIGS. 26-27, retractor mechanism 130' is a single-spindle configuration, with a spindle 33 arranged within the retractor housing 22 on plate 29. The spindle 33 is configured to take up cord/line parts 40/45/47 via the ports 24 as it is guided through a series of fixed cord routing guides 141 arranged within the cavity 28 of the retractor housing 22 onto the spindle 33 bounded by its flanges 32. The routing guides 141 may also serve another purpose in limiting the amount of the larger diameter neck cord 40 that is wrapped around spindle 33, thereby preventing overload of spindle 33.

The spindle 33 rotates on an axle 31 supporting a hub 38. A drive spring 34 imparts a torque to the spindle 33. Spindle 33 includes a locking pin track 36 and locking pin 37, the function of which is omitted for purposes of brevity as it operates as described with regard to FIG. 17.

Another configuration in the variable retractor system described herein is referred to as a flex configuration. Like the landing configuration described previously, the flex configuration provides the wearer full adjustability in setting the perch. FIGS. 28A to 30B to be described hereafter are directed to various flex configurations for achieving an automatic perch. The embodiments shown in FIGS. 28A to 30B are applicable to system 10 as shown in any of FIGS. 1-10 and in conjunction with any of the stopper embodiments shown in FIGS. 15A-16C and retractor mechanisms of the system 10 as shown in FIGS. 17-25, and are described with some of the components of system 10 removed for purposes of clarity.

In each of the embodiments in FIGS. 28A to 30B, the base 20 includes two openings functioning as both a stop rest and a port, depending on the state of the flex configuration; however only one port/stop rest location is shown for purposes of brevity, as in these embodiments only one stopper 60 is required.

Figure 28B:
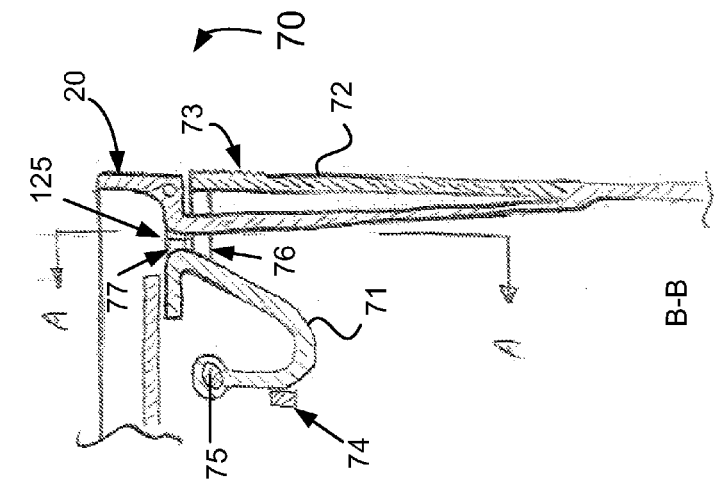
FIG. 28B is a partial rear view taken along line B-B of FIG. 28A to show interior details thereof of the flex configuration.
Figure 28D:
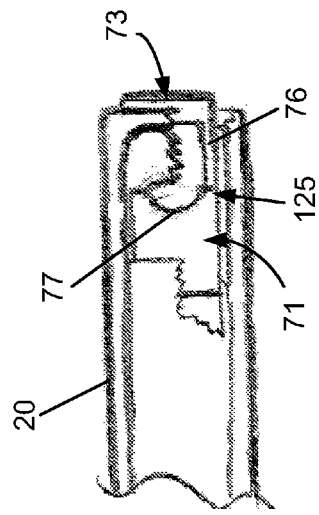
FIG. 28D is a partial top plan view of the base showing a part of the flex configuration.
Figure 28A:
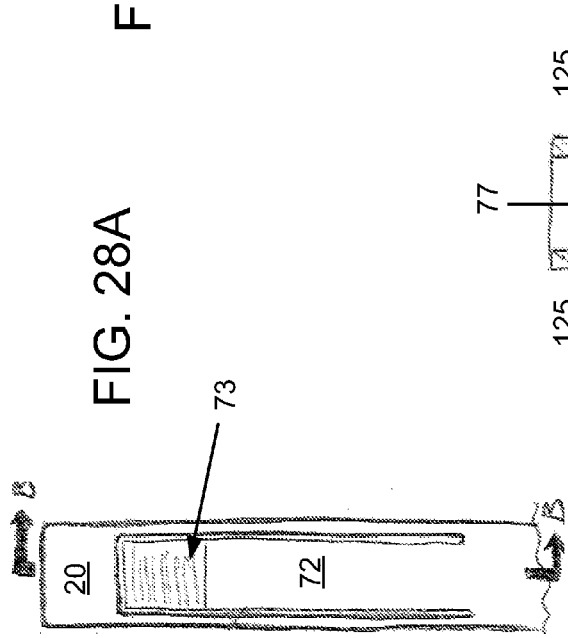
FIG. 28A is a partial side view of the base to illustrate a flex configuration for achieving an adjustable perch for the wearer according to an example embodiment.
Figure 28C:
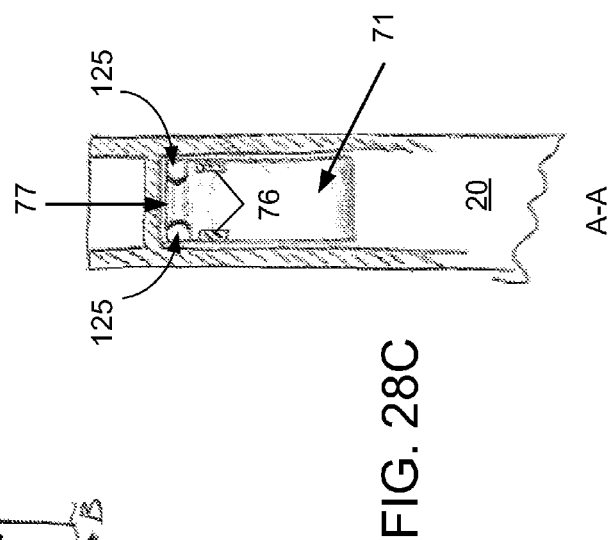
FIG. 28C is a sectional view taken along line A-A of FIG. 28B.

FIG. 28A is a partial side view of the base to illustrate a flex configuration for achieving an adjustable perch for the wearer to an example embodiment; FIG. 28B is a partial rear view taken along line B-B of FIG. 28A to show interior details thereof of the flex configuration; FIG. 28C is a sectional view taken along line A-A of FIG. 28B; and FIG. 28D is a partial top plan view of the base showing a part of the flex configuration.

Referring to FIGS. 28A-D, a flex assembly 70 of the system 10 to facilitate an automatic perch for the wearer thereof includes a flex door 71, a flex arm 72 and a flex button 73 having a connector tab 76 which movably bears on flex door 71. The flex door 71 bears against a fixed post 74 and is connected to base 20 at retainer 75. The flex door 71 may also be connected to the base 20 at various points in order to achieve an anchor from which to flex. In the closed position, a rib 77 abuts base 20 so as to form a stop rest 125, as shown in FIG. 28B. In operation, the flex button 73 is pushed (by the wearer) which causes the flex arm 72 (via connector tab 76) to push against the flex door 71, which is otherwise bearing via rib 77 against base 20 to form the stop rest (shown generally at 125 to denote both the stop rest and the port) thus keeping the port closed to act as the stop rest 125. When pushed, the flex door 71 separates rib 77 from base 20 to open the stop rest 125 so as to become the port 125, at which point the stopper 60 (not shown) may pass through port 125 (e.g., upon full retraction of the cord/line part 40/45/47). The flex door 71 and surrounding geometry are shaped such that as the stopper 60, upon cord/line part 40/45/47 extension, is drawn through the stop rest 125, the stop rest 125 is forced to open and thus become a port 125.

FIG. 29A is a partial rear view taken along line B-B of FIG. 29B to show interior details thereof of a flex configuration for achieving an adjustable perch for the wearer according to another example embodiment; and FIG. 29B is a sectional end-view taken along line A-A of FIG. 29A to illustrate a partial top plan view of the base with selected interior components of the flex configuration thereof.

Referring to FIGS. 29A-B, a flex assembly 170 of the system 10 to facilitate an automatic perch for the wearer thereof includes a reduced flexor component comprising a flexor seat 171, a flex arm 172 and a flex button 173. The flexor seat 171 is constrained under tension between flanges 176, 177 of the base 20. Flex arm 172 may also be integral to the base 20. Element 125 denotes the functions of both a stop rest and a port.

The reduced flexor component may be tensioned such that it forcibly maintains the stop rest 125, and such that a force is required to be applied to the flex arm 172 to open the stop rest 125 and thus create a port 125, such a force may be applied by the stopper 60 (not shown) as it is being pulled and extracted through the stop rest 125, or possibly by a finger pushing on the flex button 173. Specifically, action on the flex arm 172 (shown by arrows) moves a connector arm 179 connected to a cord guide 178 which may ride in a tab slot 175 toward flex limiter 174 so as to open up port 125.

FIG. 30A is a partial side view of the base of the holder to illustrate a flex configuration for achieving an adjustable perch for the wearer according to another example embodiment, and FIG. 30B is a partial rear view taken along line A-A of FIG. 30A to show interior details thereof of the flex configuration.

Referring to FIGS. 30A-B, a flex assembly 270 of the system 10 to facilitate an automatic perch for the wearer thereof includes a pivot 271, a flex arm 272, a flex button 273, a stop 274, and a fixed cord guide 277 attached to base 20. Element 125 denotes the functions of both a stop rest and a port.

Without deformation, the top 278 of the flex arm 272 naturally helps form a stop rest (arrow denoting location at 125). Upon the wearer pushing on the flex button 273 against the stop 274, the flex arm 272 encounters the pivot 271 and thus deforms (see arrows 275 and 276). The flex arm 272 bends such that the stop rest 125 is opened to create a port. The top of the flex arm 272 and the surrounding geometry are shaped such that upon cord/line part 40/45/47 extension, as the stopper 60 (not shown) can be drawn to the stop rest 125, the stop rest 125 is forced to open and thus becomes a port.

The landing and flex configurations described above each interface with the stopper 60 to provide a wearer full adjustability in setting the perch. FIGS. 31A to 37B to be described hereafter are directed to various slider configurations for achieving an automatic perch. The embodiments shown in FIGS. 31A to 37B are applicable to system 10 as shown in any of FIGS. 1-10 and in conjunction with any of the stopper embodiments shown in FIGS. 15A-16C and the retractor mechanisms of the system 10 as shown in FIGS. 17-27, and are described with some of the components of system 10 removed for purposes of clarity.

FIG. 31A is a partial top plan view of the base taken along line B-B of FIG. 31B to illustrate a slider configuration for achieving an adjustable perch for the wearer according to an example embodiment; and FIG. 31B is a sectional view taken along line A-A of FIG. 31A to show a partial rear view with interior details thereof of the slider configuration.

Referring to FIGS. 31A-B, a pull slider assembly 80 of the system 10 to facilitate an automatic perch for the wearer thereof includes a slider 81, a post 82, a slider tab 83, and a spring 84 within base 20. The spring 84 is attached to slider 81 and pushes against or pulls on the post 82 so that the slider 81 moves or partially impedes an opening (shown as a port 24). In such a position, the cord/line parts 40/45/47 can pass through port 24 via the stop rest 25 and slider channel 88 in slider 81, but the stopper 60 is inhibited from passage through the port 24 by the stop rest 25. A port 24 is also shown on the other side of base 20 with phantom dotted line delineating cord/line parts 40/45/47. Each of the slider embodiments hereafter include two ports, only one of which is shown for purposes of brevity, as in this and each of the following slider embodiments only one stopper 60 is required.

The slider 81 may be confined in its movement by flanges 85 formed in the base 20 or other means such that it slides to impede and/or to expose a port 24. The slider 81 may also have a curved parts 86 bounding spring 84, as shown in FIG. 31B. Slider tab 83 is attached to the slider 81 and may move such that it pulls or pushes the slider 81 to expose the port 24. Upon the wearer releasing the slider tab 83, the spring 84 causes return of the slider 81 (spring-biased return). By pushing on the slider and surrounding geometry, the stopper 60 upon cord/line part 40/45/47 extension also causes movement of the slider 81 as the stopper 60 is pulled to and through the port 24.

FIG. 32A is a variant of FIG. 31A to illustrate another slider configuration for achieving an adjustable perch for the wearer, FIG. 32B illustrates a profile view of the slider alone, and FIG. 32C illustrates an end view of the slider to show structural elements thereof in more detail.

Referring to FIGS. 32A-C, the structure of the slider 181 here differs from the previous embodiment in that it includes a slot 182 for the slider tab 83 of the previous embodiment, and a spring fastener 185 for the spring 184. Additionally, the slider 181 has a lengthwise flange 189 on either side that may limit its travel. A dotted line in FIG. 32B also shows the location of the stop rest 25 that inhibits stopper 60 movement into the slider channel 188. These are also shown in the end view of FIG. 32C.

Figure 33A:
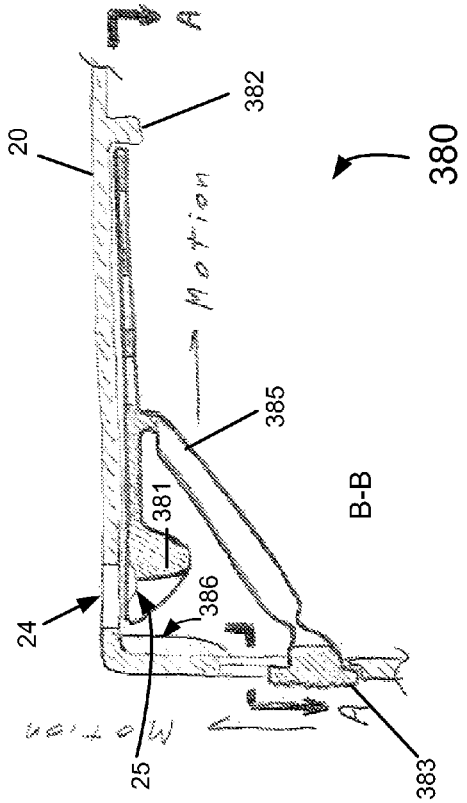
FIG. 33A is a sectional view taken along line B-B of FIG. 33B to show a partial rear view of the base with of the holder so as to illustrate a slider configuration for achieving an adjustable perch for the wearer according to an example embodiment.
Figure 33B:
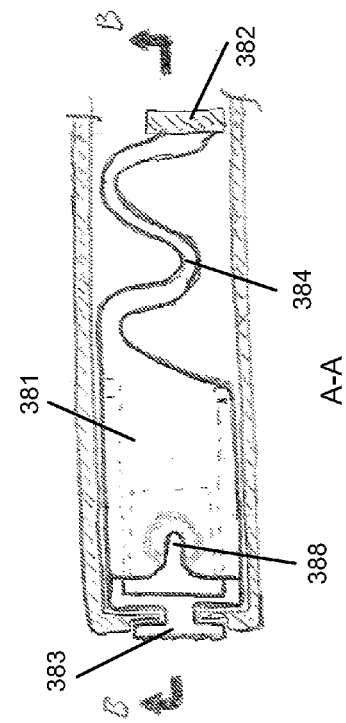
FIG. 33B is a sectional view taken along line A-A of FIG. 33A, showing a partial top plan view of the base with interior details thereof of the slider configuration.

FIG. 33A is a sectional view taken along line B-B of FIG. 33B to show a partial rear view of the base with of the holder so as to illustrate a slider configuration for achieving an adjustable perch for the wearer according to an example embodiment, and FIG. 33B is a sectional view taken along line A-A of FIG. 33A, showing a partial top plan view of the base with interior details thereof of the slider configuration.

Referring to FIGS. 33A-B, a cam slider assembly 280 of the system 10 to facilitate an automatic perch for the wearer thereof includes a cam slider 281, a spring post 282, a slider tab 283, and a spring 284 within base 20. The spring 284 is attached to cam slider 281 and pushes against or pulls on the spring post 282 so that the cam slider 281 moves or partially impedes port 24 (port 24 shown on only one side for clarity). In such a position, the cord/line parts 40/45/47 can pass through port 24 via the stop rest 25 and slider channel 288 in cam slider 281, but the stopper 60 is inhibited from passage through the port 24 by the stop rest 25.

The cam slider 281 is confined in its movement by flanges 287 formed in the base 20 or thereon (such as shown in FIG. 32C) such that it slides to impede and/or to expose a port 24. Here the slider tab 283 moves such that it pushes the cam slider 281 to expose the port 24. Upon the wearer releasing the slider tab 283, the spring 284 causes return of the cam slider 281 (spring-biased return). By pushing on the cam slider 281 and surrounding geometry, the stopper 60 also causes movement of the cam slider 281 as the stopper 60 is pulled to and through the port 24.

Figure 34A:
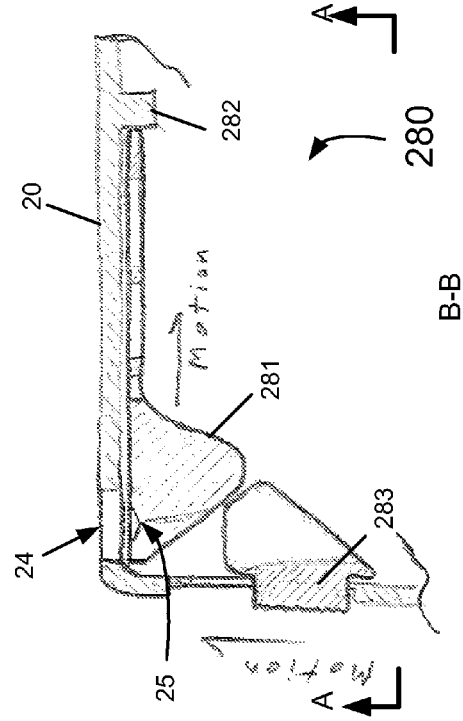
FIG. 34A is a sectional view taken along line B-B of FIG. 34B to show a partial rear view of the base of the holder so as to illustrate a slider configuration for achieving an adjustable perch for the wearer according to another example embodiment.
Figure 34B:
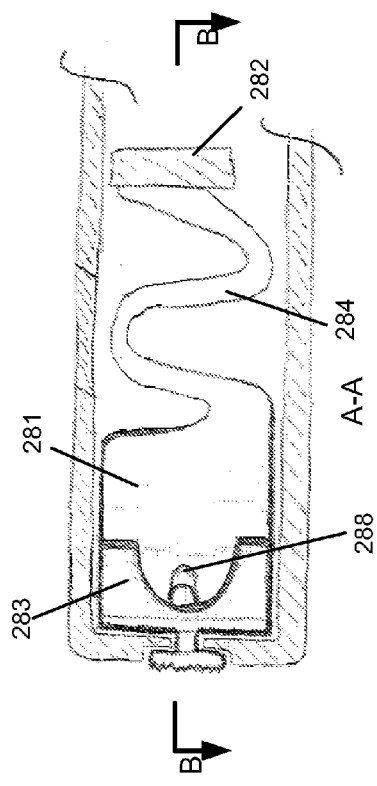
FIG. 34B is a sectional view taken along line A-A of FIG. 34A, showing a partial top plan view of the base with interior details thereof of the slider configuration.

FIG. 34A is a sectional view taken along line B-B of FIG. 34B to show a partial rear view of the base of the holder so as to illustrate a slider configuration for achieving an adjustable perch for the wearer according to another example embodiment; and FIG. 34B is a sectional view taken along line A-A of FIG. 34A, showing a partial top plan view of the base with interior details thereof of the slider configuration.

Referring to FIGS. 34A-B, a push rod slider assembly 380 of the system 10 to facilitate an automatic perch for the wearer thereof includes a push rod slider 381, a post 382, a slider tab 383, a spring 384, and a connector rod 385 within base 20. The spring 384 is attached to push rod slider 381 and pushes on the spring post 382 so that the push rod slider 381 moves or partially impedes port 24 (port 24 shown on only one side for clarity). In such a position, the cord/line parts 40/45/47 can pass through port 24 via the stop rest 25 and slider channel 388 in push rod slider 381, but the stopper 60 is inhibited from passage through the port 24 by the stop rest 25.

The push rod slider 381 is confined in its movement by flanges 386 formed in the base 20 or thereon (such as shown in FIG. 34A) such that it slides to impede and/or to expose a port 24. Here the slider tab 383 moves such that it pushes the push rod slider 381 via connector rod 385 to expose the port 24. Upon the wearer releasing the slider tab 383, the spring 384 causes return of the push rod slider 381 (spring-biased return). By pushing on the push rod slider 381 and surrounding geometry, the stopper 60 also causes movement of the push rod slider 381 as the stopper 60 is pulled to and through the port 24.

FIG. 35A is a partial sectional view of an upper part of the holder base so as to illustrate a slider configuration for achieving an adjustable perch for the wearer according to another example embodiment; and FIG. 35B is a sectional view taken along line A-A of FIG. 35A, showing a partial bottom/underside view of the base with interior details thereof of the slider configuration, and FIG. 35C is a top plan view of part of the base.

Referring to FIGS. 35A-C, a locking slider assembly 480 of the system 10 to facilitate an automatic perch for the wearer thereof includes a slider 481 and a slider tab 483 riding in a slot 485 within base 20. If the slider 481 is not already clear of the port 24 and in the open position, then by pushing on the slider 481 and surrounding geometry the stopper 60 upon cord/line part 40/45/47 extension causes movement of the slider 481 to clear the port 24 as the stopper 60 is pulled to and through the port 24. In such a position, the cord/line parts 40/45/47 can pass through port 24 via the stop rest 25 and slider channel 488 in the slider 481.

To create the stop rest 25, the slider tab 483 is pushed to move the slider 481 into the closed position against cord guide 486, at which point it clicks into position such that it is not free to move without force re-applied in the opposite direction on the slider tab 483. During normal usage, the forces applied by the cord/line parts 40/45/47 in this direction are not enough to un-click the slider 481 from the closed position.

FIG. 36A is a sectional view taken along line B-B of FIG. 36C to show a partial upper rear corner view of the base of the holder so as to illustrate a slider configuration for achieving an adjustable perch for the wearer according to another example embodiment; FIG. 36B is a sectional view taken along line A-A of FIG. 36A; and FIG. 36C is a partial top plan view of the base to show the port and slider tab in more detail.

Referring to FIGS. 36A-C, a push slider assembly 580 of the system 10 to facilitate an automatic perch for the wearer thereof includes a slider 581, a tab 582, a slider tab 583, a spring 584 with spring fastener 585, rib 586 and a fixed angle arm 587 within base 20.

In operation, the slider 581 comes to rest in the closed position such that the stop rest 25 is created, with the top end of the slider 581 abutting rib 586. The slider 581 tends to remain in that position due to a tensile force from its own spring 584 which is attached to the base 20. Withdrawal of the stopper 60 may move the slider 581 up such that the stop rest 25 opens to form a port 24, as shown in FIG. 36A.

After the stopper 60 has exited the port 24, the slider 581 returns to the closed position and the port 24 closes to re-form a stop rest 25. A force applied to the slider tab 583 (upward relative to the side of base 20, by the wearer, for example, as shown in FIG. 36A) may also open the stop rest 25 to form a port 24 such that a stopper 60 may pass through as the cord/line parts 40/45/47 is being retracted, for example. Upon release of the force on the slider tab 583, the slider 581 will return to the closed position.

Figure 37A:
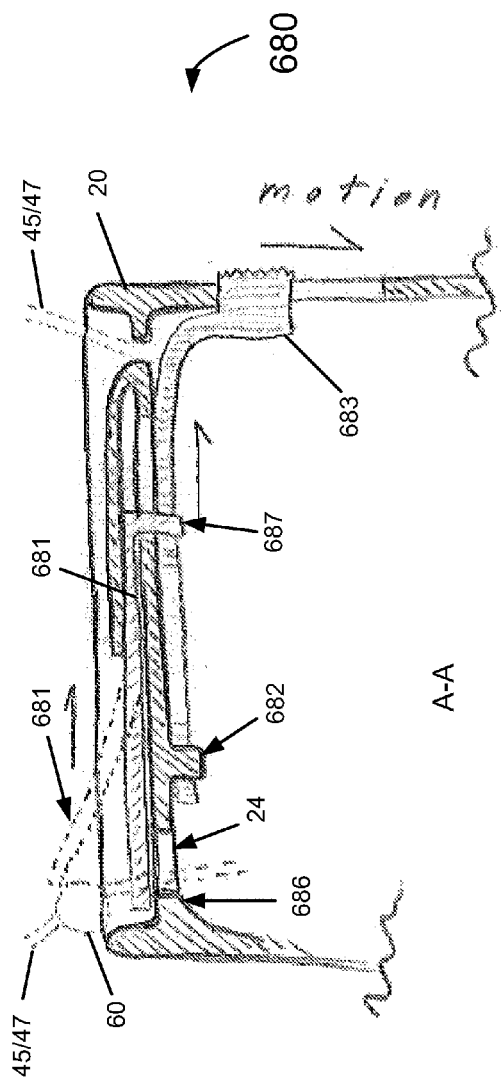
FIG. 37A is a partial sectional view of an upper part of the base of the holder so as to illustrate a slider configuration for achieving an adjustable perch for the wearer according to another example embodiment.
Figure 37B:
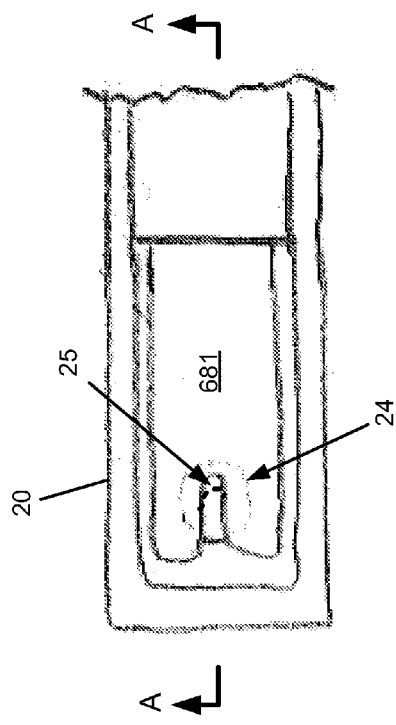
FIG. 37B is a partial top plan view of the base with selected components removed to see elements of the slider and port in more detail.
Figure 41A:
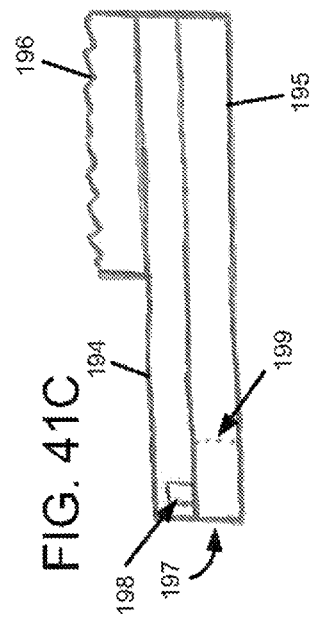
FIG. 41A is a perspective view of the tab brake.
Figure 41C:
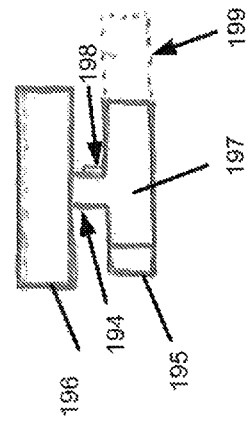
FIG. 41C is a left side elevational view of the tab brake.
Figure 41B:
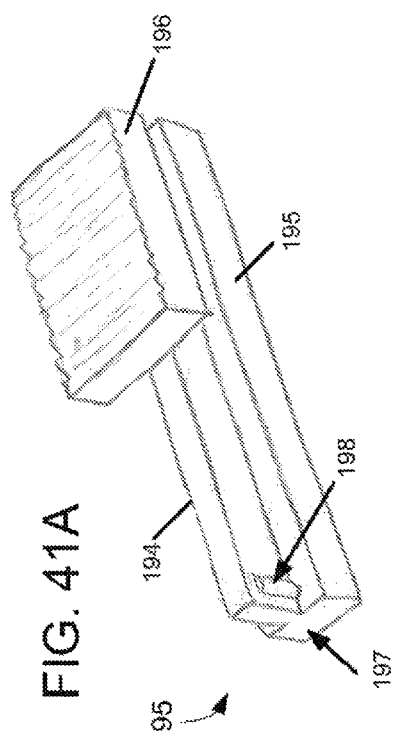
FIG. 41B is a top plan view of the tab brake.
Figure 41D:
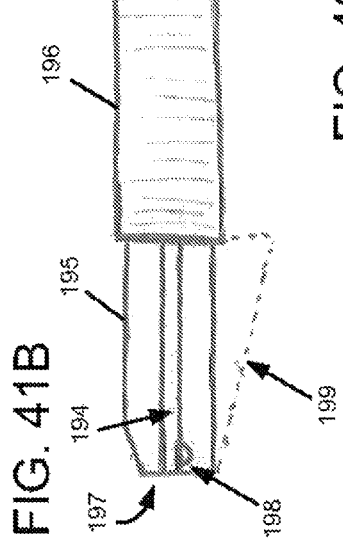
FIG. 41D is a front plan view of the tab brake.

FIG. 37A is a partial sectional view of an upper part of the base of the holder so as to illustrate a slider configuration for achieving an adjustable perch for the wearer according to another example embodiment, and FIG. 37B is a partial top plan view of the base with selected components removed to see elements of the slider and port in more detail.

Referring to FIGS. 37A-B, a flap slider assembly 680 of the system 10 to facilitate an automatic perch for the wearer thereof includes a flexible flap slider 681 have a tab 687 affixed to a slider tab 683, a fixed surface 682 supporting the flap slider 681 thereon and creating a channel for flap slider 681 lateral movement therein. A port 24 exists between an end of fixed surface 682 and a cord guide 686 formed on an inner surface of base 20, as shown in FIG. 37A. Also in FIG. 37A, a stopper 60 on line parts 45/47 is shown in phantom to denote a bending action of the flap slider 681. This may be any of the stoppers shown in FIGS. 15A-16C.

The flap slider 681 comes to rest in the closed position such that a stop rest is created, shown generally at 25 in FIG. 37B. The flap slider 681 remains in that position due to a tensile force from a spring (such as shown in several of the previous slider embodiments) attached to base 20. Withdrawal of the stopper 60 (by wearer grasping the cord/line parts 40/45/47 and/or stopper 60 itself) may cause a portion of the flap slider 681 to bend such that the stop rest opens and the port 24 is open. After the stopper 60 has exited the port 24, the flap slider 681 returns to the closed position and the port 24 is closed to re-engage the stop rest function. A force applied to the slider tab 683 (such as by the wearer) may also open the stop rest (moving flap slider 681 in the channel to open the port 24 such that a stopper 60 may pass through while the cord/line parts 40/45/47 is being retracted for example. Upon release of the force on the slider tab 683, the flap slider 681 returns to the closed position.

Heretofore, setting the perch has been described in which the wearer employs a wide array of variable set stops or stoppers on the cord in conjunction with landing, flex and/or slider-type configurations provided as part of the structure of the device holder to achieve an automatic perch or resting position of the base 20 on the wearer's body. Additionally, each of these configurations for achieving an automatic perch may be used with a number of described retractor mechanism embodiments contained within a retractor housing 22 which forms part of the base 20.

However, the desired perch may be achieved without use of a stopper on the cord/line parts 40/45/47. In the following embodiments, a brake assembly shall be described which may provide the wearer the ability to set incremental perch positions.

FIGS. 38A to 42 to be described hereafter are directed to a brake assembly for achieving an adjustable perch. The embodiments shown in FIGS. 38A to 42 are applicable to system 10 as shown in any of FIGS. 1-10 and in conjunction with any of the retractor mechanisms of the system 10 as shown in FIGS. 17-27, and are described with several of the components of system 10 removed for purposes of clarity.

FIG. 38A is a sectional view taken along line A-A of FIG. 38B to illustrate a brake assembly for achieving an adjustable perch for the wearer according to an example embodiment; FIG. 38B is a partial rear view of selected components of the brake assembly with the base removed; and FIG. 38C is a sectional view taken along line B-B of FIG. 38A.

In FIGS. 38A-C, much of the base 20 and associated components have been removed, only a portion of the base 20 show the cooperating components of a brake assembly 90 are illustrated for purposes of clarity. Referring to FIGS. 38A-C, a brake assembly 90 of the system 10 to facilitate an incremental perch for the wearer thereof includes a brake 91, brake track 92, spindle 93 rotating on axle 131, brake guide 94, a tab brake 95 actuated by the wearer and movable within a tab brake slot within base 20, and a slide envelope 98 which bounds the movement of the tab brake 95.

The brake 91's location and/or movement may be controlled minimally by two forces. The brake 91 moves within the brake track 92 on the spindle 93. The brake 91 moves radially within the brake track 92 as determined by its location in the spiral slot 97 of the brake guide 94.

FIG. 39A is a plan view of the brake guide and tab brake slot; and FIG. 39B is a sectional view taken along line A-A of FIG. 39A. Referring additionally to FIGS. 39A and 39B, the spindle has a brake guide 94 configured as a spiral slot 97 provided to guide the brake 91. In other words, two circular slots 97 (one inner and one outer) are joined by a path in a spiral fashion to form the brake guide 94, as shown best in FIG. 39A. The tab brake slot 96 is designed to guide the tab brake 95. The brake guide 94 is formed in the base 20. The brake body 191 rides in the brake track 92 on the spindle 93, the center of which rotates on axle 131.

As the cord/line parts 40/45/47 is extended, a brake guide tab 193 slides in the brake guide 94, forcing the brake 91 to move in a spiral path towards the center of the spindle 93. Upon retraction of the cord/line parts 40/45/47, the brake 91 will reverse direction and travel outward in the tab brake slot 96 and in the spiral brake guide 94 (see also FIGS. 38B and 38C).

FIGS. 40A-C is front plan, top plan and side elevational views of the brake. FIGS. 41A-D are perspective, top plan, left side elevational and front plan views of the tab brake. Referring to FIGS. 40A through 41D, the brake includes a brake body 191, a brake spring 192 and a brake guide tab 193. The tab brake 95 includes a rail 194, flange 195, a tab 196, a stop face 197, and a nipple 198 on the front left-hand side of rail 194. Optionally, one or both lower sides of the flanges 195 can have a taper 199.

The brake spring 192 ensures that the tab brake 95 enters a spiral portion of the brake guide 94 and does not remain in either the inner or outer ring of the brake guide 94. The flange 195 slides between the inside of the base 20 and spindle 93. The brake guide tab 193 slides within the brake guide 94 as the brake 91 rotates or moves. If at an end of its travel path within the brake track 92, the brake spring 192 ensures that the brake guide tab 193 enters a spiral portion of a brake guide 94 (as opposed to staying on a strictly circular path.) as part of the brake 91 meets the tab-brake 95, and thus the spring 192 prevents further rotation or movement of the brake track. The length of the brake guide tab 193 may exceed the width of the portion of the tab brake slot 96 that the rail 194 of the tab brake 95 travels in The brake 91 when rotating with the spindle 93 may meet the tab brake 95 at the stop face 197, which may be a straight or a positively or negatively angled portion of a flange 195 edge. The flange 195 is wide so that when pushed by the brake 91 it resists deformation and may distribute a load more broadly to its rail 194 and/or to the tab brake slot 96. The flange 195 may be tapered inwardly (see 199) on either or both sides such that contact with the brake 91 pushes the flange 195 approximately laterally to the brake 91's path. The nipple 198 is designed to align with and press-fit or click into a particular ring of the brake guide 94 as discussed below.

Upon extending the cord/line parts 40/45/47 and with the brake 91 in an inner position, the tab brake 95 can be moved such that the stop face 197 becomes aligned with a given ring of the brake guide 94. At such a time, the nipple 198 may "click" into a ring of the brake guide 94 and cause resistance to further movement of the tab brake 95. With the stop face 197 of the tab brake 95 in such a position, it will stop the brake 91 from further rotation as the brake 91 meets the stop face 197 during its rotation. This will terminate further retraction of the cord/line parts 40/45/47. Accordingly, the nipple 198 allows the tab brake 95 to be set by the wearer at incremental positions so as to incrementally set the perch, or resting position for the system 10 on the wearer's body.

Figure 42:
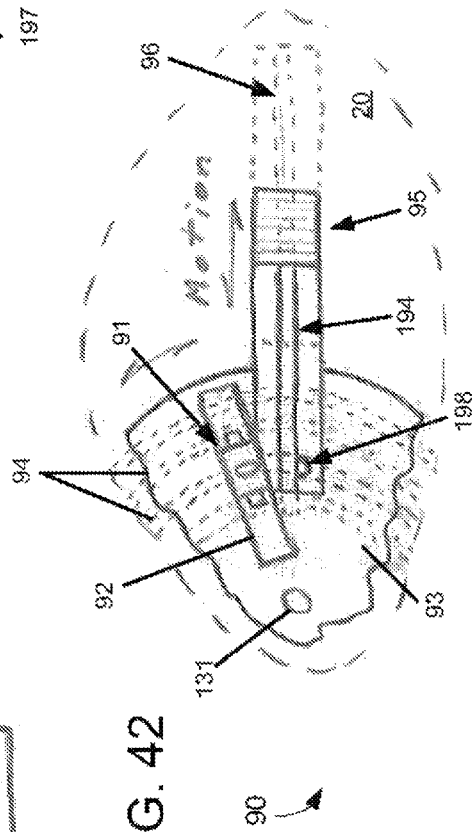
FIG. 42 is a partial top plan view of the brake assembly with the spindle retraction stopped at the perch.

FIG. 42 is a partial top plan view of the brake with the spindle retraction stopped at the perch. In FIG. 42, a small portion of the base 20 is shown in dashed oval, with 2 slots or rings of the brake guide 94 shown by sets of dashed curved lines. The elements are similar to FIGS. 38A to 41D, thus only the differences are discussed in detail.

In brake assembly 90, the brake 91 is shown within the brake track 92 rotating on the spindle 93 and following the brake guide 94. The tab brake 95 is shown with its nipple 198 set at some position that has been "dialed in" by the wearer. For example, if the tab brake slot 96 has several notch positions or location (e.g., 1-6 for the nipple 198 to click into selected slots of the guide track 94), the wearer can selected a desired position to set the tab brake 95 in the tab brake slot 96 so that the nipple 198 "click's into" a desired ring or circular slot of the brake guide 94. Once the brake 91 in its brake guide 92 rotates around with the spindle 93 and reaches the tab brake 95, it will stop the brake 91 from further rotation as the brake 91 meets the stop face 197 (or flange taper 199) of the tab brake 95 during its rotation. This will terminate further retraction of the cord/line parts 40/45/47.

Heretofore, an example system has been described in which various configurations enable a perch to be automatically or incrementally set for the wearer, with or without a stopper on the line part. However, system structure of FIGS. 1-9 may be configured with either retraction mechanism in FIGS. 17-27, but a manual option via a spindle brake may be employed to provide a fully variable adjustable perch. Moreover, instead of employing a tab brake 95 with nipple 198, other detent or brake mechanisms may be employed to provide full adjustability of the perch for the wearer and/or the set the cord/line part extraction length.

FIG. 43A is a sectional view taken from line A-A of FIG. 43B of a spindle brake assembly for achieving a fully adjustable perch for the wearer according to an example embodiment; FIG. 43B is a sectional view taken from line B-B of FIG. 43A; FIG. 44A is a top view, FIG. 44B a side view, and FIG. 44C an end view of the spindle brake. In FIGS. 43A to 44C several of the components associated with base 20 are removed for purposes of clarity, namely the ports 24 and cord/line parts 40/45/47. The example manual spindle brake assembly 190 heretofore describe may be applicable in a single or multiple spindle configuration, a single spindle 33 is shown for illustration purposes only.

Referring to FIGS. 43A to 44C, a push rod button 193 on an outer surface of the base 20 is actuatable by the wearer to control a spindle brake 191. The brake 191 has a sloping surface 198 that is spring biased via a spring 34 attached to a flange 196. The spindle 33 rotates freely when the wearer has engaged the push rod button 193. Accordingly, the wearer sets the perch after each individual usage of base 20 with device 15, the assembly 190 thus provides locking and setting the perch via locking. In order to set the perch, the wearer simply holds or presses the push rod button 193 in (forcing the sloping surface of the spindle brake 191 upward between guides 194 and 195 against the spring, releasing the jagged teeth edges 297 which have engaged corresponding teeth 197 on the flanges 32 of the spindle to permit free spindle 33 rotation, thereby returning the cord/line parts 40/45/47 into the base 20 to set the perch position. The push rod button 193 may thus be used to disable a lock on the cord/line parts 40/45/47 that keeps it from retracting. Once the wearer releases the push rod button 193 the brake 191 is reengaged onto the flange 32 of the spindle 33 by the force of spring 34, which locks the spindle 33 and terminates further rotation.

Accordingly, the example embodiments having been described, the aforementioned system 10 provides various configurations for easily setting the perch (resting position) for the base 20 with device 15 therein on the body of the wearer. The example configurations substantially reduce the demand on the wearer, e.g., minimize the effort in setting the resting position before and during any particular period of usage of the device 15. This provides a high degree of automation (i.e., simplicity of setting and simplicity of usage) that may be desirable to the wearer.

The example embodiments being thus described, it will be obvious that the same may be varied in many ways. For example, system 10 is applicable to myriad combinations of devices, contents and/or uses, including but not limited to: ordering, stock-checking, database-access-entry, bar-code-reading, etc., by the likes of retail sales people (for example, inventory access for retail salespeople, or a food ordering device for a waiter/waitress), delivery people (for example, FedEx, food, precious items), military, and/or factory floor workers.

The example system 10 can be applied to systems for creating recordings for doctors, writers, speakers, scientists, researchers, designers needing to capture thoughts, etc. The system 10 described herein is equally applicable to one or more of instruments, detectors, collectors, weapons, information, tools, equipment, etc. that might be used or desired by the likes of electricians, inspectors, stationary or mobile workers, scuba divers, lab technicians, medical personnel, military, security personnel (police, coast-guard, FBI, etc.), musicians, etc. (for example: for use by a person who roams and tracks energy usage, water levels, pollution, etc.; or for a factory floor worker to track WIP as it moves around a factory floor).

The example base 20 may be further applicable to the carrying of signage or other types of communications devices; providing protection for the device or contents (from breaking or damage, from being dropped, from theft, etc.); holding it while in use; visibility by user (while in use and/or otherwise); notification to, and/or visibility by, others (e.g., a safety patrol may want to wear a walkie-talkie on the chest so others will know emergency communication is possible, or a sales person at a trade show may want others to see an eye-catching video on an electronic display that he/she is wearing); and for some it may also include elements of fashion, style, or prestige.

Therefore, the example system 10 described above addresses issues and/or creates opportunities for various different natures including ease of use and/or access, immediacy of access and/or visibility of a device for the user/wearer and/or other(s); protection of the device 15 and base 20 from breakage, theft, weather, etc.

Further, the retractor mechanism(s) have heretofore been described as being incorporated into part of the base (retractor housing 22); however, it is also envisioned that a retraction mechanism may instead be incorporated into the device 15. In this case, a station (i.e. an item that does not contain a retraction mechanism) may be the place and/or item to which the device 15 is returned to or retracted to.

It is also envisioned that various forms of communications or transfer may take place between the device 15 (in an electronic device embodiment) and the base 20 while the device 15 is extracted. In such scenarios, the cord/line parts 40/45/47 may include, or may be accompanied by, or may be replaced by, materials and/or components that provide additional functionality or benefit. For example, tubes may transfer materials (e.g., chemicals to or from the device) while they may also provide retraction force and/or torque; gold chain may provide aesthetic benefit; wire or other conductive material may transfer or transmit data and/or signals; etc. Such variations are not to be regarded as departure from the example embodiments, and all such modifications as would be obvious to one skilled in the art are intended to be included herein.

What is claimed is:

1. A system, comprising:
   a base adapted to hold a device which is removable therefrom,
   a retractor mechanism coupled to the base and having a retractable cord wound thereon, the cord having ends extending out at least one opening of the base as a line part of the retractable cord for access by a wearer of the base,
   at least one stopper on a line part of the retractable cord, and
   setting means providing adjustability of a perch position on the wearer for the base, wherein the setting means further includes:
   a flexible member arranged along a side of the base,
   a flex button coupled to the flexible member, and
   wherein a force applied to one of the flex button and flexible member causes the flexible member to open or create the opening for permitting retraction to or extension of the retractable cord with stopper from the base to enable or disable the perch.

2. The system of claim 1, wherein the setting means enables automatic engagement of the perch position desired by the wearer.

3. The system of claim 1, wherein grasping of the retractable cord by the wearer to pull the line part with stopper off the retraction mechanism provides the force which causes the stopper to move the flexible member so as to open or create the opening.

4. The system of claim 1, wherein actuation of the flex button by the wearer provides the force which causes the flexible member to open or create the opening.

5. A system, comprising:
   a base adapted to hold a device which is removable therefrom,
   a retractor mechanism coupled to the base and having a retractable cord wound thereon, the cord having ends extending out at least one opening of the base as a line part of the retractable cord for access by a wearer of the base,
   at least one stopper on a line part of the retractable cord, and
   setting means providing adjustability of a perch position on the wearer for the base, wherein the setting means further includes:
   a slider component within the base that is biased under spring pressure to prevent stopper passage through the opening in the base,
   a slider tab operable by the wearer to move the slider so as permit stopper passage through the opening onto the retractor mechanism, and
   wherein a force is applied to one of the slider component and slider tab causing the slider component to move so as to uncover the opening in the base for permitting retraction to or extension of the retractable cord with stopper from the retractor mechanism to enable or disable the perch.

6. The system of claim 5, wherein grasping of the retractable cord by the wearer to pull the fully retracted line part with stopper off the retraction mechanism provides the force which causes the stopper to move the slider component so as to uncover the opening to the outside of the base.

7. The system of claim 5, wherein actuation of the slider tab by the wearer provides the force which overcomes spring pressure to move the slider components so as to uncover the opening to the outside of the base.

8. A system, comprising:
   a base adapted to hold a device which is removable therefrom,
   a retractor mechanism coupled to the base and having a retractable cord wound thereon, the cord having ends extending out at least one opening of the base as a line part of the retractable cord for access by a wearer of the base, and setting means providing adjustability of a perch position on the wearer for the base, wherein the setting means further includes:

a brake assembly within the base, composed of:

a brake which rides back and forth in a lateral brake track as it rotates on a spindle of the retractor mechanism configured to take up the retractable cord, the spindle having a plurality of spaced, spiral brake guides, a tab brake set by the wearer to establish an incremental perch position, the tab brake having a rail extending toward the spindle with a nipple, the incremental perch position established by the location where the nipple is inserted into a brake guide to prevent further movement of the tab brake, wherein as the brake meets a facing of the tab brake, the facing prevents further brake rotation with the spindle, terminating spindle rotation and retraction of the cord thereon.

9. The system of claim 8, wherein the nipple enables the tab brake to be set by the wearer at different positions so as to enable incremental settings of the perch or to disengage the perch.

10. A system providing an adjustable resting position for a wearer of a holder having a removable device therein, comprising:

a generally rectangular base having sides and a backing to hold the device, a retractor mechanism coupled to the base and having a retractable cord wound thereon with both ends extending there from through at least one opening in the base as a line part of the retractable cord for access by the wearer, and at least one stopper on each line part of the retractable cord to provide an adjustable resting position for the wearer without repeated adjustment of the cord or retractor mechanism, wherein the at least one stopper includes a rear hinge and a front groove with a tab, and the groove is opened to move the stopper along the cord, and the cord is secured within a chamber of the opened stopper by pressing the tab shut, thereby realizing a desired resting position.

11. The system of claim 10, wherein the retractable cord includes a larger diameter neck cord connected to smaller diameter line parts, the line parts including the at least one stopper thereon and comprising a substantial length of the retractable cord that is to be wound onto the retractor mechanism.

12. A system providing an adjustable resting position for a wearer of a holder having a removable device therein, comprising:

a generally rectangular base having sides and a backing to hold the device, a retractor mechanism coupled to the base and having a retractable cord wound thereon with both ends extending there from through at least one opening in the base as a line part of the retractable cord for access by the wearer, and at least one stopper on each line part of the retractable cord to provide an adjustable resting position for the wearer without repeated adjustment of the cord or retractor mechanism, wherein the at least one stopper includes a first transverse slot with a narrower central diameter and wider outside diameter to take up loose cord and adjust the stopper along the cord to the desired resting position, the excess pulled thru a second slot perpendicular to the first slot so that the cord is friction held in the narrower central diameter.

13. A system providing an adjustable perch for a wearer of a holder having a removable device therein, comprising:

a base having sides and a backing to hold the device therein, the base including a pair of spaced cord ports at an upper end thereof, a retractor mechanism retained within a retractor housing that forms part of the base and having a retractable cord wound thereon with both ends extending there from through a corresponding cord port as a line part of the retractable cord for access by the wearer, at least one stopper on the line part of the retractable cord, a stop rest formed as an indentation in spaced relation to a corresponding cord port, each stop rest having a channel formed there through, a slot extending between a corresponding cord port and stop rest, the stopper engagable to the stop rest to prevent further retracting of the cord so as to set the perch upon cord retraction to the retractor mechanism, wherein the wearer grasps the retractable cord to extend the cord fully out through the cord ports, and sets the at least one stopper at the desired location on the line part so to set the perch upon release of the cord and retraction by the retraction mechanism, retraction terminating as the stopper meets the stop rest.

14. The system of claim 13, wherein the retractor mechanism further includes:

a major spindle on a geared hub, a minor spindle below the major spindle on a second hub, a drive spring for driving the major spindle, a band having a toothed configuration on an inner surface thereof, the band coupled to the geared hub and second hub, the band adapted to take on and pay out the retractable cord via the cord ports.

15. The system of claim 13, wherein the retractor mechanism further includes:

a spindle on axle supporting a hub, the spindle bounded by a set of flanges, a drive spring, a band arranged on the spindle between the flanges, a plurality of cord routing guides within the retractor housing for routing the retractable cord via the cord ports onto the band, the drive spring imparting a torque to the spindle which in turn exerts a force on the band.

* * * * *